United States Patent
Boström et al.

(10) Patent No.: US 9,781,669 B2
(45) Date of Patent: Oct. 3, 2017

(54) STATISTICS-ASSISTED SCELL SELECTION

(71) Applicant: Telefonaktiebolaget L M Ericsson (publ), Stockholm (SE)

(72) Inventors: Lisa Boström, Solna (SE); Rasmus Axén, Linköping (SE); Håkan Axelsson, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 14/325,037

(22) Filed: Jul. 7, 2014

(65) Prior Publication Data

US 2015/0087316 A1    Mar. 26, 2015

Related U.S. Application Data

(63) Continuation-in-part of application No. 14/251,021, filed on Apr. 11, 2014.
(Continued)

(51) Int. Cl.
*H04B 1/38* (2015.01)
*H04M 1/00* (2006.01)
(Continued)

(52) U.S. Cl.
CPC ......... *H04W 52/0212* (2013.01); *H04L 5/001* (2013.01); *H04L 5/0058* (2013.01);
(Continued)

(58) Field of Classification Search
None
See application file for complete search history.

(56) References Cited

U.S. PATENT DOCUMENTS

| 8,509,810 B2 | 8/2013 | Sanders et al. |
| 9,055,565 B2 | 6/2015 | Kim et al. |

(Continued)

FOREIGN PATENT DOCUMENTS

| EP | 2326122 A1 | 5/2011 |
| EP | 2525597 A1 | 11/2012 |

(Continued)

OTHER PUBLICATIONS

Author Unknown, "3rd Generation Partnership Project; Technical Specification Group Radio Access Network; Evolved Universal Terrestrial Radio Access (E-UTRA); Physical channels and modulation (Release 10)," Technical Specification 36.211, Version 10.7.0, Feb. 2013, 3GPP Organizational Partners, 101 pages.
(Continued)

*Primary Examiner* — Moustapha Diaby
(74) *Attorney, Agent, or Firm* — Patent Portfolio Builders, PLLC

(57) ABSTRACT

Systems and methods for Secondary Cell (sCell) selection for wireless devices operating according to a carrier aggregation scheme in a cellular communications network are disclosed. More specifically, in some embodiments, a statistics-assisted sCell selection process is utilized for sCell selection. This statistics-assisted sCell selection process improves the efficiency of sCell selection, particularly where there are multiple candidate sCells on multiple carrier frequencies.

20 Claims, 19 Drawing Sheets

Related U.S. Application Data

(60) Provisional application No. 61/880,689, filed on Sep. 20, 2013.

(51) Int. Cl.
*H04W 36/00* (2009.01)
*H04W 52/02* (2009.01)
*H04L 5/00* (2006.01)
H04W 28/08 (2009.01)

(52) U.S. Cl.
CPC ........ *H04W 28/08* (2013.01); *H04W 36/0083* (2013.01); *Y02B 60/50* (2013.01)

(56) References Cited

U.S. PATENT DOCUMENTS

| | | | |
|---|---|---|---|
| 2004/0067759 | A1 | 4/2004 | Spirito et al. |
| 2004/0116110 | A1 | 6/2004 | Amerga et al. |
| 2004/0121770 | A1* | 6/2004 | Tigerstedt et al. ........... 455/436 |
| 2004/0121773 | A1 | 6/2004 | O'Brien |
| 2004/0152471 | A1 | 8/2004 | MacDonald et al. |
| 2007/0225045 | A1 | 9/2007 | Jordan et al. |
| 2009/0279494 | A1 | 11/2009 | Halbauer et al. |
| 2010/0036161 | A1 | 2/2010 | Bontempelli et al. |
| 2010/0093356 | A1 | 4/2010 | Lee et al. |
| 2010/0167744 | A1* | 7/2010 | Grob-Lipski et al. ........ 455/436 |
| 2010/0240356 | A1 | 9/2010 | Lee et al. |
| 2011/0044285 | A1* | 2/2011 | Jang et al. ..................... 370/331 |
| 2011/0117917 | A1* | 5/2011 | Gresset et al. ................ 455/436 |
| 2011/0299446 | A1 | 12/2011 | Chun et al. |
| 2012/0004010 | A1* | 1/2012 | Tamura et al. ............... 455/525 |
| 2012/0142361 | A1* | 6/2012 | Zhao et al. ................... 455/446 |
| 2012/0250578 | A1 | 10/2012 | Pani et al. |
| 2012/0276945 | A1 | 11/2012 | Chindapol et al. |
| 2012/0327878 | A1 | 12/2012 | Pedersen et al. |
| 2013/0022016 | A1 | 1/2013 | Wei |
| 2013/0130695 | A1* | 5/2013 | Ryu et al. ..................... 455/438 |
| 2013/0194947 | A1 | 8/2013 | Ehsan et al. |
| 2013/0229307 | A1 | 9/2013 | Chang et al. |
| 2014/0011513 | A1 | 1/2014 | Watts et al. |
| 2014/0140293 | A1 | 5/2014 | Sharma et al. |
| 2014/0187246 | A1* | 7/2014 | Jha ........................ H04W 48/08 455/436 |
| 2014/0213263 | A1 | 7/2014 | Ryan et al. |
| 2014/0307623 | A1 | 10/2014 | Gheorghiu et al. |
| 2015/0087315 | A1 | 3/2015 | Lu et al. |
| 2015/0156773 | A1* | 6/2015 | Yao ........................ H04L 5/001 370/252 |
| 2015/0172949 | A1 | 6/2015 | Lee et al. |
| 2015/0223125 | A1 | 8/2015 | Lu et al. |

FOREIGN PATENT DOCUMENTS

| | | |
|---|---|---|
| EP | 2775758 A1 | 9/2014 |
| WO | 2010036161 A1 | 4/2010 |
| WO | 2013028128 A1 | 2/2013 |
| WO | 2013063885 A1 | 5/2013 |

OTHER PUBLICATIONS

Author Unknown, "3rd Generation Partnership Project; Technical Specification Group Radio Access Network; Evolved Universal Terrestrial Radio Access (E-UTRA); Physical layer procedures (Release 8)," Technical Specification 36.213, Version 8.8.0, Sep. 2009, 3GPP Organizational Partners, 77 pages.
Author Unknown, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," Technical Specification 36.300, Version 10.11.0, Sep. 2013, 3GPP Organizational Partners, 195 pages.
Author Unknown, "3rd Generation Partnership Project; Technical Specification Group Radio Access Network; Evolved Universal Terrestrial Radio Access (E-UTRA); Radio Resource Control (RCC); Protocol specification (Release 10)," Technical Specification 36.331, Version 10.11.0, Sep. 2013, 3GPP Organizational Partners, 308 pages.
Author Unknown, "3rd Generation Partnership Project; Technical Specification Group Radio Access Network; Evolved Universal Terrestrial Radio Access (E-UTRA); LTE Positioning Protocol (LLP) (Release 10)," Technical Specification 36.355, Version 10.11. 0, Dec. 2013, 3GPP Organizational Partners, 118 pages.
Author Unknown, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," Technical Specification 36.300, Version 11.7.0, Sep. 19, 2013, 3GPP Organizational Partners, 209 pages.
Author Unknown, "3rd Generation Partnership Project; Technical Specification Group Radio Access Network; Evolved Universal Terrestrial Radio Access (E-UTRA); Radio Resource Control (RRC); Protocol specification (Release 11)," Technical Specification 36.311, Version 11.5.0, Sep. 16, 2013, 3GPP Organizational Partners, 347 pages.
International Search Report and Written Opinion for PCT/IB2014/064292 mailed Dec. 23, 2014, 14 pages.
Nokia Siemens Networks et al., "R2-130124: User data rate enhancements with inter-site CA," 3rd Generation Partnership Project (3GPP), TSG-RAN WG2 Meeting #81, Jan. 28-Feb. 1, 2013, Malta, 4 pages.
Nsn et al., "R2-132339: Autonomous SCell Management for Dual Connectivity Cases," 3rd Generation Partnership Project (3GPP), TSG-RAN WG2 Meeting #83, Aug. 19-23, 2013, Barcelona, Spain, 4 pages.
Qualcomm Incorporated, "R4-130402: SCell Reporting Issues," 3rd Generation Partnership Project (3GPP), TSG-RAN WG4 Meeting #66, Jan. 28-Feb. 1, 2013, St. Julian's, Malta, 2 pages.
Invitation to Pay Additional Fees and Partial International Search Report for PCT/IB2015/050739, mailed Apr. 7, 2015, 9 pages.
Author Unknown, "Technical Specification Group Radio Access Network; Evolved Universal Terrestrial Radio Access (E-UTRA); Radio Resource Control (RRC); Protocol specification (Release 11)," Technical Specification 36.331, Version 11.5.0, 3GPP Organizational Partners, Sep. 2013, 347 pages.
New Postcom, "R3-112498: Carrier Selection for Macro-Pico Scenario," 3rd Generation Partnership Project (3GPP), TSG RAN WG3 Meeting #73bis, Oct. 10-14, 2011, 3 pages, Zhuhai, China.
Pedersen, Klaus I. et al., "Mobility Enhancements for LTE-Advanced Multilayer Networks with Inter-Site Carrier Aggregation," IEEE Communications Magazine, vol. 51, Issue 5, May 2013, IEEE, pp. 64-71.
Shen, Zukang et al., "Overview of 3GPP LTE-Advanced Carrier Aggregation for 4G Wireless Communications," Communications Magazine, vol. 50, Issue 2, Feb. 2012, IEEE, pp. 122-130.
Written Opinion for International Patent Application No. PCT/IB2014/064292, mailed Aug. 27, 2015, 9 pages.
International Search Report and Written Opinion for International Patent Application No. PCT/IB2015/054699, mailed Aug. 28, 2015, 16 pages.
Non-Final Office Action for U.S. Appl. No. 14/171,338, mailed Aug. 3, 2015, 36 pages.
International Search Report and Written Opinion for International Patent Application No. PCT/IB2015/050739, mailed Sep. 2, 2015, 22 pages.
Final Office Action for U.S. Appl. No. 14/251,021, mailed Apr. 15, 2016, 16 pages.
Final Office Action for U.S. Appl. No. 14/171,338, mailed Feb. 11, 2016, 43 pages.
Applicant-Initiated Interview Summary for U.S. Appl. No. 14/171,338, mailed Mar. 18, 2016, 3 pages.
Advisory Action, Examiner-Initiated Interview Summary, and AFCP 2.0 Decision for U.S. Appl. No. 14/171,338, mailed Apr. 27, 2016, 4 pages.

(56) References Cited

OTHER PUBLICATIONS

International Preliminary Report on Patentability for International Patent Application No. PCT/IB2014/064292, mailed Dec. 4, 2015, 10 pages.
Non-Final Office Action for U.S. Appl. No. 14/251,021, mailed Nov. 3, 2015, 15 pages.
Final Office Action for U.S. Appl. No. 14/251,021, mailed Dec. 14, 2016, 20 pages.
Non-Final Office Action for U.S. Appl. No. 14/171,338, mailed Nov. 3, 2016, 42 pages.
Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," Technical Specification 36.300, Version 12.2.0, 3GPP Organizational Partners, Jun. 2014, 215 pages.
Written Opinion for International Patent Application No. PCT/IB2015/054699, mailed Jun. 10, 2016, 9 pages.
Advisory Action and AFCP 2.0 Decision for U.S. Appl. No. 14/251,021, mailed Jun. 15, 2016, 4 pages.
Non-Final Office Action for U.S. Appl. No. 14/251,021, mailed Jul. 21, 2016, 17 pages.

\* cited by examiner

STATISTICS-ASSISTED SCELL SELECTION

RELATED APPLICATIONS

This application is a Continuation-in-Part of U.S. patent application Ser. No. 14/251,021, filed Apr. 11, 2014, which claims the benefit of provisional patent application Ser. No. 61/880,689, filed Sep. 20, 2013, the disclosures of which are hereby incorporated herein by reference in their entireties.

FIELD OF THE DISCLOSURE

The present disclosure relates to a cellular communications network, and more particularly relates to secondary cell selection for wireless devices operating according to a carrier aggregation scheme.

BACKGROUND

Carrier aggregation was introduced in $3^{rd}$ Generation Partnership Project (3GPP) Long Term Evolution (LTE) Advanced Release 10 (LTE Rel-10) as an LTE-Advanced feature. Using carrier aggregation, multiple component carriers (CCs) can be aggregated and jointly used for transmission to or from a single wireless device. Each component carrier can have any of the LTE Release 8 (LTE Rel-8) bandwidths: 1.4, 3, 5, 10, or 20 Megahertz (MHz). Up to five component carriers can be aggregated to give a maximum aggregated bandwidth of 100 MHz. Further, each component carrier normally uses the LTE Rel-8 structure to provide backward compatibility (i.e., each component carrier appears as an LTE Rel-8 carrier).

FIG. 1 illustrates one example of carrier aggregation. In this example, cells 10-0 through 10-4, having carrier frequencies $F0$, $F1$, $F2$, $F3$, and $F4$, respectively, can be aggregated. In this example, the cells 10-0 through 10-4 are transmitted by a single base station 12. With respect to a particular wireless device, one of the cells 10-0 through 10-4 serves as a Primary Cell (pCell) of the wireless device, where the pCell sets up the Radio Resource Control (RRC) connection. The component carrier of the pCell is referred to as the Primary Component Carrier (PCC). Other cells configured to be aggregated with the pCell for the wireless device are referred to as Secondary Cells (sCells) having corresponding Secondary Component Carriers (SCCs). All of the configured aggregated cells for the wireless device are referred to as serving cells of the wireless device.

The coverage areas of the cells 10-0 through 10-4 may differ either due to different component carrier frequencies or due to power planning on the different component carriers. In the example of FIG. 1, the cell 10-0 has the largest coverage area and serves as the pCell for wireless devices A, B, C, D, and F located in (i.e., connected to) the cell 10-0. The cells 10-1 through 10-4 have successively smaller coverage areas and may serve as sCells for wireless devices B through F. In this example, the wireless device A has no sCell coverage, the wireless device B has sCell coverage for one of the possible sCell candidates (namely cell 10-1), the wireless device C has sCell coverage for two sCell candidates (namely cells 10-1 and 10-2), the wireless device D has sCell coverage for three sCell candidates (namely cells 10-1, 10-2, and 10-3), and the wireless device F has sCell coverage for four sCell candidates (namely cells 10-1, 10-2, 10-3, and 10-4). Therefore, depending on the position of a wireless device within the pCell, the wireless device may have no sCell coverage or may have coverage of one or more cells which are considered possible sCell candidates.

For a wireless device connected to the pCell on carrier frequency $F0$ (e.g., wireless device A), the base station 12 normally starts inter-frequency layer 3 (L3) measurements on candidate sCell(s) in order to determine whether the wireless device has any sCell coverage. For instance, the base station 12 normally starts inter-frequency L3 measurements such as, for example, a measurement that triggers an A4 event when the inter-frequency L3 measurement for an sCell becomes better than a threshold. In the LTE specifications, an A4 event occurs when a neighboring cell becomes better than a threshold, which is referred to herein as an A4 threshold. In the example of FIG. 1, with a proper A4 threshold, an A4 event will trigger on carrier frequency $F1$ for the wireless device B to thereby indicate that the wireless device B has sCell coverage via the cell 10-1. In contrast, for the wireless device F, an A4 event will trigger on carrier frequencies $F1$, $F2$, $F3$, and $F4$ to thereby indicate that the wireless device F has sCell coverage via cells 10-1, 10-2, 10-3, and 10-4. Based on the measurement event triggering, one or more sCells are selected and configured for each wireless device having sCell coverage.

One issue with this normal sCell selection process is that the inter-frequency measurements may require measurement gaps. Measurement gaps are periods during which there is no traffic in both the uplink and downlink directions. Using measurement gaps to perform the inter-frequency measurements for sCell selection will incur 7-15% throughput loss on already configured cells depending on the gap pattern configured. For this reason it is not desirable to use inter-frequency measurement based SCell selection for the User Equipment devices (UEs) which require gaps. Thus, an existing alternative solution to using measurements is to select among available SCell candidates blindly instead of based on coverage.

Another issue with the normal sCell selection process is that to perform any measurements (inter-frequency or intra-frequency, gap or gapless measurements) on the candidate sCells, the parameter s-Measure may have to be disabled. As defined in the LTE specifications, when the pCell's Reference Signal Received Power (RSRP) measurement is not below s-Measure, the wireless device is not required to perform any neighbor cell measurements, including the measurements on the candidate sCell(s), in order to save battery power. Thus, in order to guarantee that the measurements on the candidate sCell(s) are being performed by the wireless devices A, B, C, D, and F when using the normal sCell selection process, the s-Measure parameter will have to be disabled, which will cause increased wireless device battery consumption.

In light of the discussion above, there is a need for systems and methods for improved sCell selection.

SUMMARY

Systems and methods for Secondary Cell (sCell) selection for wireless devices operating according to a carrier aggregation scheme in a cellular communications network are disclosed. More specifically, in some embodiments, a statistics-assisted sCell selection process is utilized for sCell selection. This statistics-assisted sCell selection process improves the efficiency of sCell selection, particularly where there are multiple candidate sCells on multiple carrier frequencies.

In one embodiment, a method of operation of a network node in a cellular communications network to provide sCell selection is provided. In one embodiment, the method of operation of the network node includes collecting statistics indicative of correlation between one or more source cells and one or more successful and/or non-successful sCells for each of the one or more source cells, and performing sCell selection based on the statistics.

In one embodiment, collecting the statistics includes receiving, from a wireless device, a measurement report including at least one measurement for a candidate sCell, determining whether the candidate sCell satisfies one or more criteria for a successful sCell based on the measurement report, and recording a success for the candidate sCell with respect to a source cell of the wireless device if the candidate sCell satisfies the one or more criteria for a successful sCell. Further, in one embodiment, collecting the statistics further includes recording a non-success for the candidate sCell with respect to the source cell of the wireless device if the candidate sCell does not satisfy the one or more criteria for a successful sCell.

In another embodiment, collecting the statistics includes determining whether a configured sCell of a wireless device is a successful sCell for the wireless device, and recording a success for the configured sCell of the wireless device with respect to a source cell of the wireless device if the configured sCell of the wireless device is determined to be a successful sCell. In one embodiment, the source cell of the wireless device is a Primary Cell (pCell) of the wireless device. In one embodiment, collecting the statistics further includes receiving a measurement report from the wireless device for the configured sCell of the wireless device, wherein determining whether the configured sCell of the wireless device is a successful sCell includes determining whether the configured sCell of the wireless device is a successful sCell based on the measurement report. In one embodiment, collecting the statistics further includes recording a non-success for the configured sCell of the wireless device with respect to the source cell of the wireless device if the configured sCell of the wireless device is determined not to be a successful sCell.

In one embodiment, determining whether the configured sCell of the wireless device is a successful sCell based on the measurement report includes determining whether a quality of the candidate sCell is better than a predefined threshold based on the measurement report. In another embodiment, determining whether the configured sCell of the wireless device is a successful sCell includes determining that the configured sCell of the wireless device is a successful sCell if there is successful transmission to or from the wireless device on the configured sCell.

In one embodiment, performing sCell selection based on the statistics includes, in order to provide sCell selection for a wireless device having a configured pCell, selecting one of a plurality of candidate sCells as an sCell for the wireless device based on the statistics. In another embodiment, performing sCell selection based on the statistics includes, in order to provide sCell selection for a wireless device, selecting one of a plurality of candidate sCells having a best possibility of being a successful sCell for the wireless device based on the statistics.

In another embodiment, performing sCell selection based on the statistics includes, in order to provide sCell selection for a wireless device, selecting a carrier frequency (which may also be referred to simply as a carrier) having a best possibility of successful sCell selection for the wireless device from a plurality of carrier frequencies based on the statistics. Performing the sCell selection further includes selecting a candidate sCell having a best possibility of being a successful sCell for the wireless device from a plurality of candidate sCells for the carrier frequency based on the statistics, and configuring the candidate sCell as an sCell of the wireless device.

In another embodiment, performing sCell selection based on the statistics includes, in order to provide sCell selection for a wireless device, selecting a carrier frequency for sCell selection for the wireless device from a plurality of carrier frequencies based on the statistics and starting measurements by the wireless device on the carrier frequency selected for sCell selection for the wireless device to thereby initiate a measurement-based sCell selection process for the wireless device on the carrier frequency selected for the wireless device. In one embodiment, selecting the carrier frequency for sCell selection for the wireless device includes selecting, based on the statistics, one of the plurality of carrier frequencies having a best possibility of having a successful sCell for the wireless device as the carrier frequency for sCell selection for the wireless device.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods for Secondary Cell (sCell) selection for wireless devices operating according to a carrier aggregation scheme in a cellular communications network are disclosed. In one embodiment, a network node obtains a list of potential sCells for a wireless device. The network node blindly selects an sCell for the wireless device from the list of potential sCells. The network node then configures the wireless device with the selected sCell. Blindly selecting the sCell for the wireless device can avoid the use of measurement gaps and reduce throughput loss, according to some embodiments.

Figure 1:
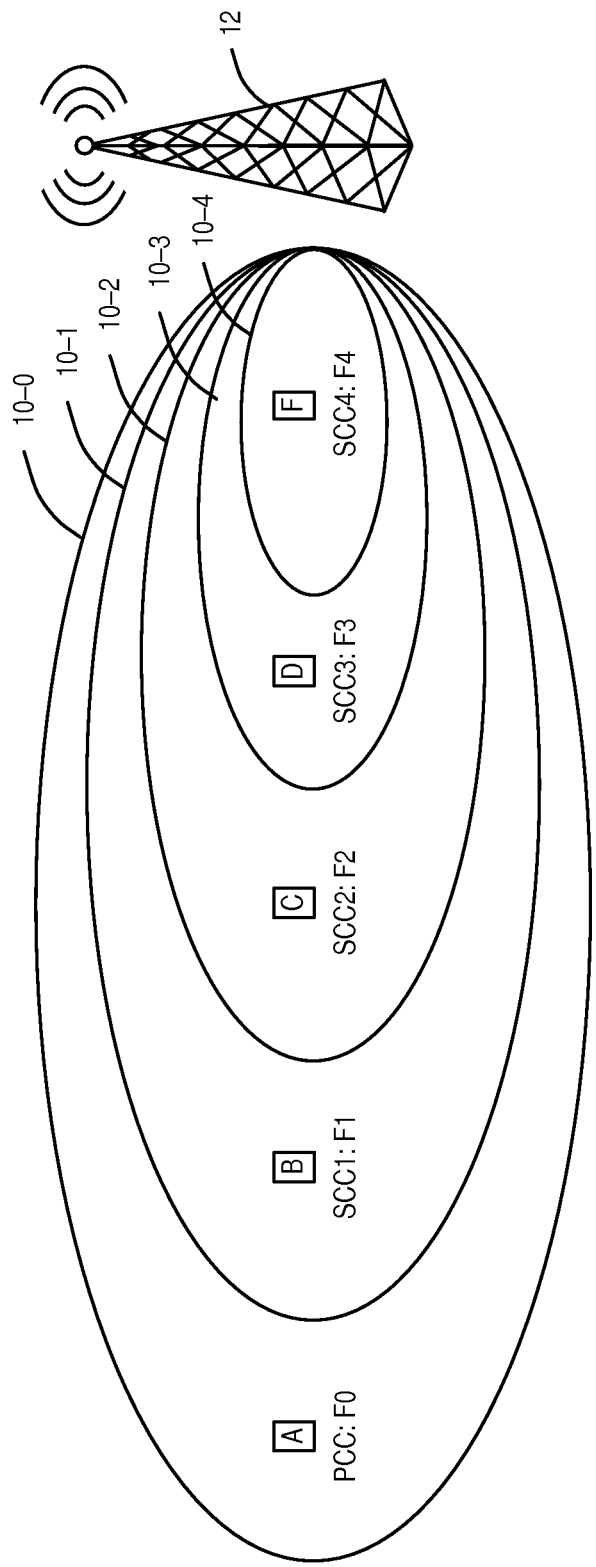
FIG. 1 illustrates one example of carrier aggregation in a cellular communications network.
Figure 2:
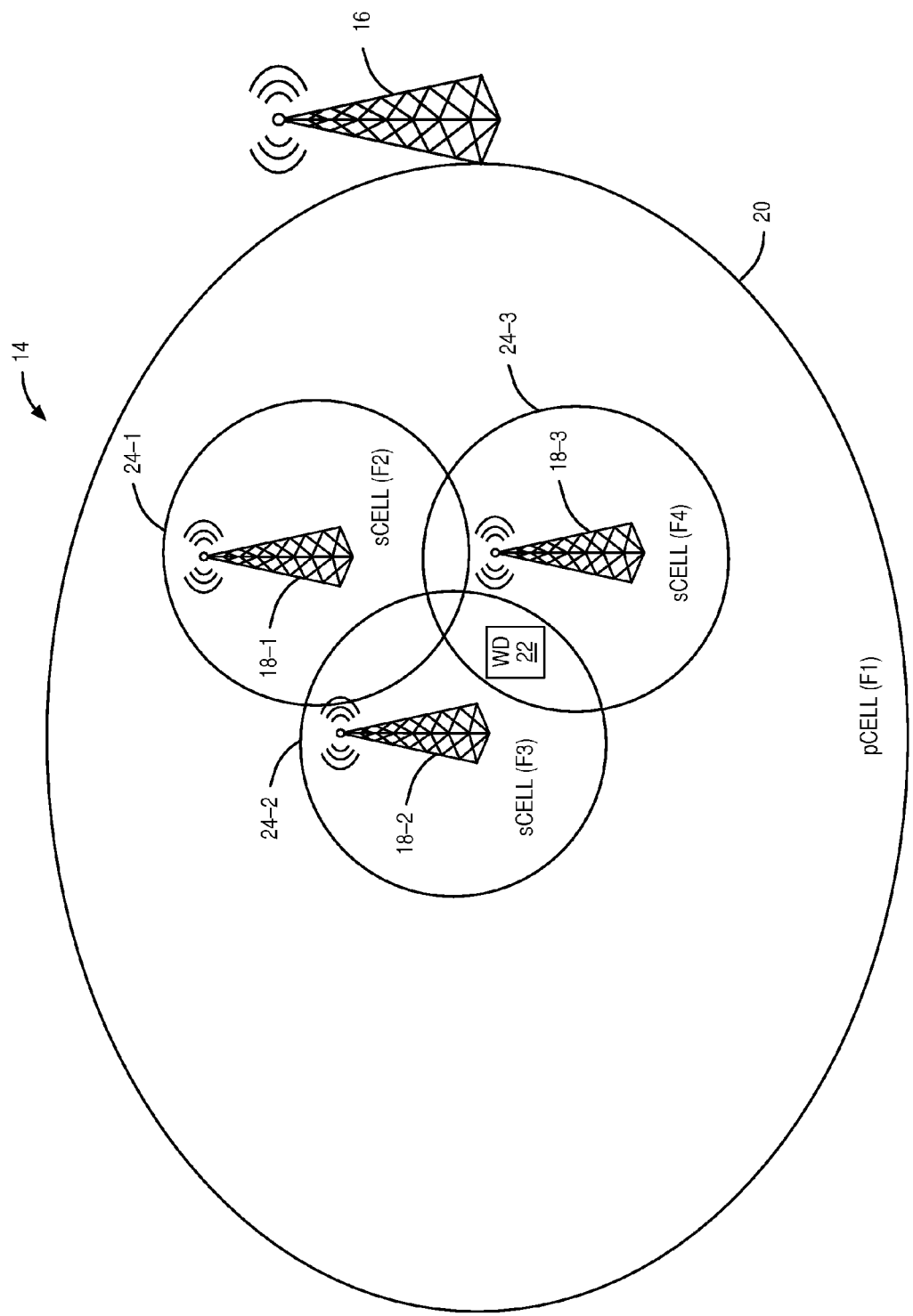
FIG. 2 illustrates a cellular communications network in which a base station performs Secondary Cell (sCell) selection for wireless devices according to one embodiment of the present disclosure.

In this regard, FIG. 2 illustrates a cellular communications network 14 in which sCell selection is performed according to one embodiment of the present disclosure. Note that in many of the embodiments described herein, the cellular communications network 14 is a 3$^{rd}$ Generation Partnership Project (3GPP) Long Term Evolution (LTE) or LTE-Advanced cellular communications network and, as such, LTE or LTE-Advanced terminology is sometimes used. However, the concepts disclosed herein can be applied to any suitable wireless network (e.g., cellular communications network) that utilizes carrier aggregation and in which sCell selection is desired.

As illustrated in FIG. 2, the cellular communications network 14 includes a base station 16, which in LTE terminology is referred to an evolved Node B (eNB) 16, and a number of Remote Radio Heads (RRHs) 18-1 through 18-3 (generally referred to herein collectively as RRHs 18 and individually as RRH 18). Notably, RRHs may alternatively be referred to as Remote Radio Units (RRUs). The RRHs 18 are RRHs of the base station 16. In this example, the base station 16 serves a cell that is a serving cell, and more particularly a Primary Cell (pCell) 20, for a wireless device 22 located within a coverage area of the pCell 20. As used herein, the coverage area of a cell (e.g., the coverage area of the pCell 20) is a geographic area covered by the cell. Cells of the RRHs 18-1 through 18-3 are sCells 24-1 through 24-3 (generally referred to herein collectively as sCells 24 and individually as sCell 24) and may be small cells, according to one embodiment. As discussed below, one or more of the sCells 24 are selected and configured as serving sCells 24 of the wireless device 22. Note that while the macro cell is the pCell 20 in this example, the macro cell may, in another example, be an sCell. For instance, using the wireless device 22 as an example, the small cell 24-2 may alternatively be the pCell for the wireless device 22 and the macro cell may alternatively be an sCell for the wireless device 22.

Figure 3:
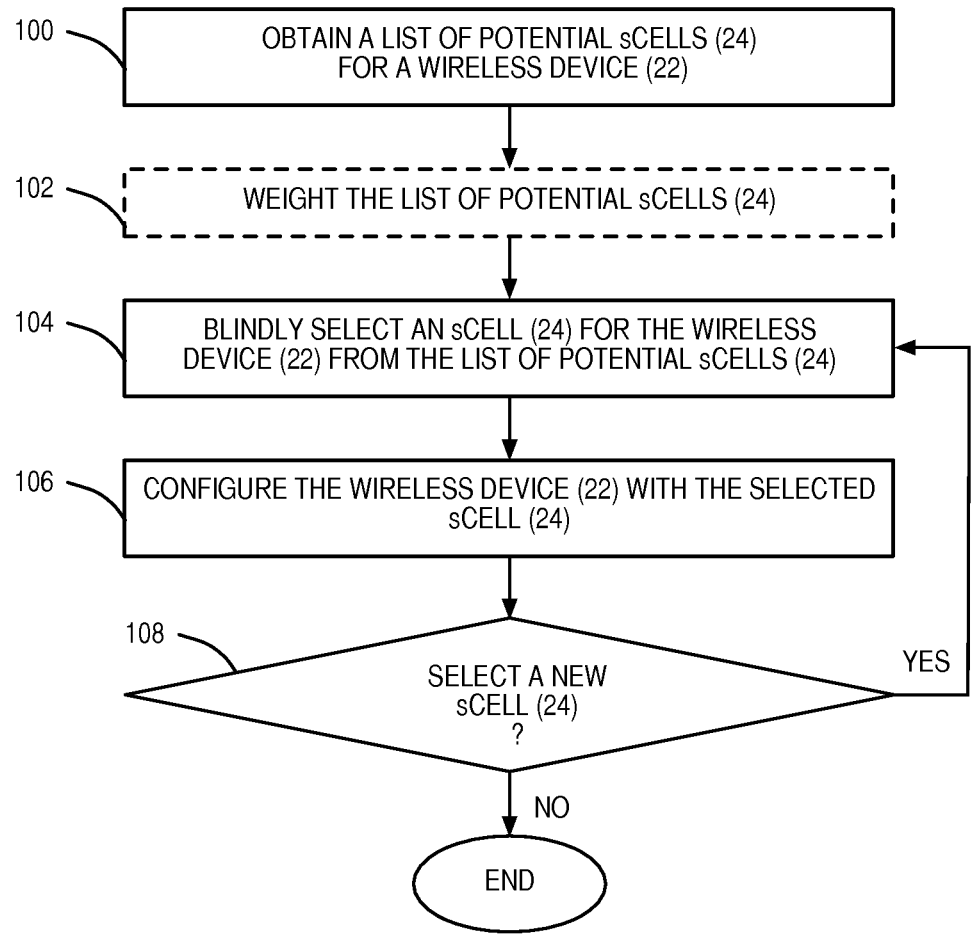
FIG. 3 illustrates the operation of a network node for configuring a wireless device with an sCell according to one embodiment of the present disclosure.

FIG. 3 illustrates the operation of a network node for selecting one of the sCells 24 for the wireless device 22 and configuring the wireless device 22 with the selected sCell 24 according to one embodiment of the present disclosure. While described for selecting a single sCell 24, this process may be used to select multiple sCells 24 in some embodiments. The network node may be any suitable network node (e.g., the base station 16, any suitable radio access network node, or any suitable core network node (e.g., a mobility management entity)). First, the network node obtains a list of potential sCells 24 for the wireless device 22 (step 100). This list of potential sCells 24 can be obtained in several ways. In one embodiment, the network node obtains a list of cells (e.g., neighboring cells) that are available to be configured as sCells 24 and capabilities of the wireless device 22. The network node then obtains the list of potential sCells 24 based on an intersection of cells available to be configured as an sCell 24 and the capabilities of the wireless device 22 (i.e., the list of potential sCells 24 is a list of cells that are both available to be configured as sCells 24 and have one or more parameters (e.g., frequency band or frequency of operation) that match the capabilities of the wireless device 22 (e.g., frequency band(s) or frequency(ies) of operation of the wireless device 22). The network node may have many cells, but not all of the cells may necessarily be available to be used as sCells 24. Furthermore, although wireless devices 22 are increasingly supporting more frequencies, there are often still frequencies that are not supported by a given wireless device 22.

After obtaining the list of potential sCells 24, the network node may optionally weight the list of potential sCells 24 (step 102). This weighting serves to make the selection of one or more sCells 24 more likely and/or to make the selection of one or more sCells 24 less likely. This can be accomplished in various ways depending on the particular implementation. In one embodiment, weighting the list of potential sCells 24 includes adding one or more duplicate entries into the list of potential sCells 24. In another embodiment, weighting the list of potential sCells 24 before blindly selecting the sCell 24 includes adjusting a probability of selection for one or more entries in the list of potential sCells 24.

Next, the network node blindly selects an sCell 24 for the wireless device 22 from the list of potential sCells 24 (step 104). As used herein, "blindly selecting" means that the sCell 24 is selected without necessarily having any indication of the sCell's suitability to serve as an sCell 24 for the wireless device 22, e.g., without first obtaining any signal quality measurement, such as an inter-frequency layer 3 (L3) measurement. By not requiring the wireless device 22 to make an L3 measurement of the potential sCell 24 before selecting the potential sCell 24, the need for measurement gaps at the wireless device 22 can be avoided. A measurement gap occurs when the wireless device 22 temporarily suspends one or more current connections (e.g., a connection to the pCell 20) in order to make the L3 measurement of the potential sCell 24. Using measurement gaps to perform the inter-frequency measurements for sCell 24 selection will incur 7-15% throughput loss on configured cells depending on the gap pattern configured. By blindly selecting the sCell 24, this throughput loss can be avoided and the increased power consumption necessary to perform measurements such as L3 measurements can be avoided as well, according to some embodiments.

In one embodiment, blindly selecting the sCell 24 includes selecting the sCell 24 from the list of potential sCells 24 based on a random selection strategy. In another embodiment, blindly selecting the sCell 24 includes selecting the sCell 24 from the list of potential sCells 24 based on a round-robin strategy. As used herein, a round-robin strategy involves selecting sCells 24 in a sequential order. In some embodiments, the list of potential sCells 24 is sorted by frequency of operation. Further, in one embodiment, the round-robin strategy is started in the list of potential sCells 24 at a position in the list that is different from a position at which a previous iteration of the round-robin strategy stopped. In one embodiment, the round-robin strategy is started in the list of potential sCells 24 at a position in the list immediately succeeding a position at which a previous iteration of the round-robin strategy stopped. It is also possible to start the round-robin strategy at a random position in the list of potential sCells 24. In these ways, the sCells 24 selected for the wireless device 22 may be different from the sCells 24 selected for other wireless devices 22 and the network node may avoid retrying sCells 24 that have recently been selected.

In addition, in some embodiments, starting the round-robin strategy at a random position in the list of potential sCells 24 may be implemented to avoid the problem of load imbalancing. Load imbalancing occurs when a relative few sCells 24 are disproportionately chosen to be configured for wireless devices 22, while other potential sCells 24 are not chosen. In the simplest scenario, each wireless device 22 is provided with the same list of potential sCells 24 and each round-robin strategy is started in the list of potential sCells 24 at the same position in the list. In this scenario, every wireless device 22 for which the first sCell 24 in the list would be appropriate will configure that sCell 24. Consequently, the sCell 24 that is last in the list will be very unlikely to be configured as an sCell 24 for a wireless device 22. Thus, the load on the different sCells 24 will be imbalanced. In some cases, this will lead to decreased quality of service for the wireless devices 22 configured to use the overused sCell 24, while resources available for the less used sCells 24 will not be utilized.

After blindly selecting an sCell 24 for the wireless device 22, the network node configures the wireless device 22 with the selected sCell 24 (step 106). In LTE, this configuration is accomplished by sending an appropriate Radio Resource Control (RRC) message to the wireless device 22. After configuring the wireless device 22 with the selected sCell 24, the network node determines whether a new sCell 24 needs to be selected (step 108). More specifically, as discussed previously in regard to step 104, since the configured sCell 24 was blindly selected, it may not be an acceptable sCell 24 for the wireless device 22. As used herein, an sCell 24 is not an acceptable sCell 24 for the wireless device 22 if either the wireless device 22 fails to connect to the sCell 24 or if the wireless device 22 indicates that the signal quality from the sCell 24 is insufficient. According to one embodiment, if the network node determines that it should select a new sCell 24 (step 108), the network node returns to step 104 and blindly selects an sCell 24 for the wireless device 22 from the list of potential sCells 24. Otherwise, the network node ends the sCell 24 selection process.

Figure 4:
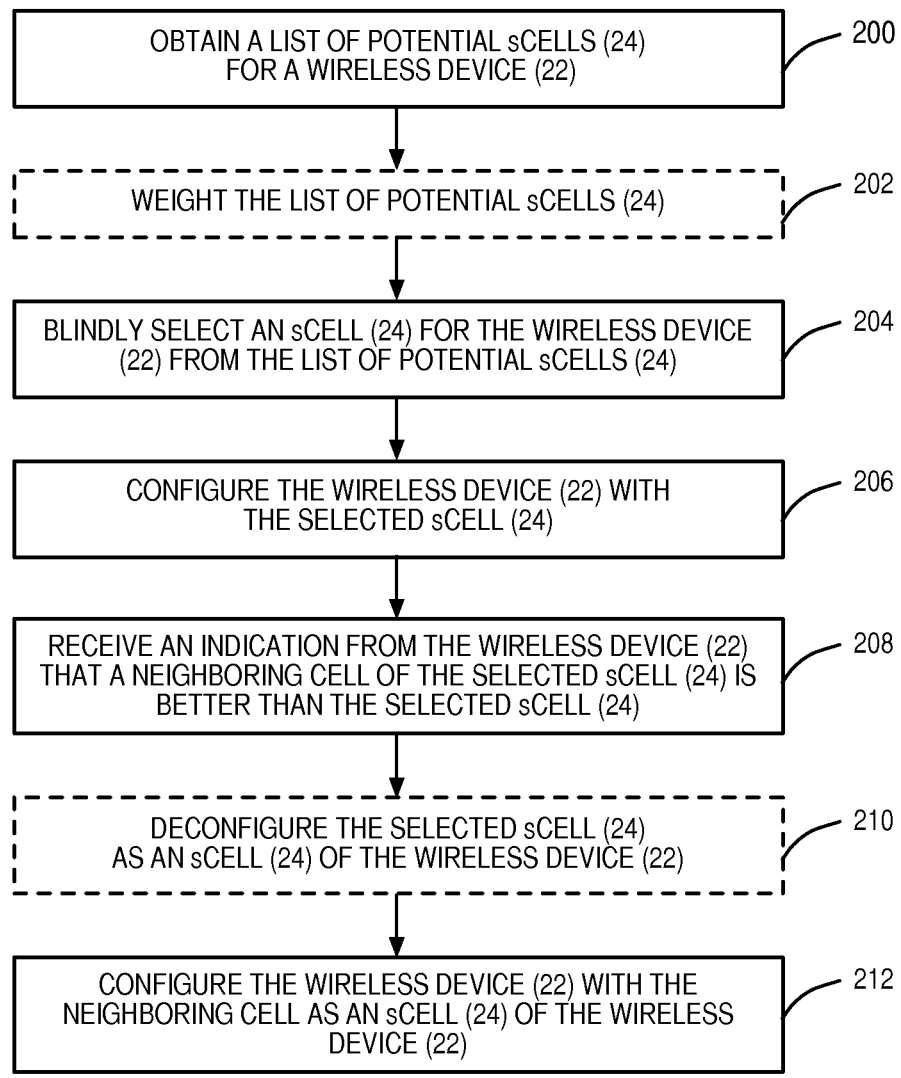
FIG. 4 illustrates the operation of a network node, including receiving an indication regarding a neighboring cell of a selected sCell according to one embodiment of the present disclosure.

FIG. 4 illustrates the operation of a network node for selecting one or more of the sCells 24 for the wireless device 22 and configuring the wireless device 22 with the selected sCell(s) 24 according to one embodiment of the present disclosure. This embodiment is similar to that of FIG. 3, but in this embodiment, after configuring the wireless device 22 with the selected sCell 24, the network node receives an indication from the wireless device 22 that a neighboring sCell 24 of the selected sCell 24 is better than the selected sCell 24. As discussed above, the network node obtains a list of potential sCells 24 for the wireless device 22 (step 200), optionally weights the list of potential sCells 24 (step 202), blindly selects an sCell 24 for the wireless device 22 from the list of potential sCells 24 (step 204), and configures the wireless device 22 with the selected sCell 24 (step 206).

After configuring the wireless device 22 with the selected sCell 24, the network node receives an indication from the wireless device 22 that a neighboring cell of the selected sCell 24 is better than the selected sCell 24 (step 208). In one embodiment, the indication is an indication of an A4 event. In the LTE specifications, an A4 event occurs when a neighboring cell of, in this example, the selected sCell 24 becomes better than a threshold, which is referred to herein as an A4 threshold. In another embodiment, the indication is an indication of an A6 event. In the LTE specifications, an A6 event occurs when a neighboring cell of, in this example, the selected sCell 24 at the same frequency becomes an offset better than the selected sCell 24. This event was added in LTE Release 10 (LTE Rel-10) specifically to facilitate carrier aggregation.

Depending on the particular implementation, in response to the indication from the wireless device 22, the network node optionally deconfigures the selected sCell 24 as an sCell 24 of the wireless device 22 (step 210). In LTE, this deconfiguration is accomplished by sending an appropriate RRC message to the wireless device 22. In this embodiment, in response to receiving the indication that the neighboring cell is better than the selected sCell 24, the network node configures the wireless device 22 with the neighboring cell as an sCell 24 of the wireless device 22 (step 212). This newly configured sCell 24 should be at least as good or better than the previously configured sCell 24. Note that before configuring the neighboring cell as an sCell 24 of the wireless device 22, the network node may determine whether the neighboring cell satisfies one or more predefined criteria. For example, the network node may first confirm that the neighboring cell is available for configuration as an sCell 24 and that one or more parameters of the neighboring cell match the capabilities of the wireless device 22. This may be done by, e.g., determining whether the neighboring cell is in the list of potential sCells 24 for the wireless device 22.

Figure 5:
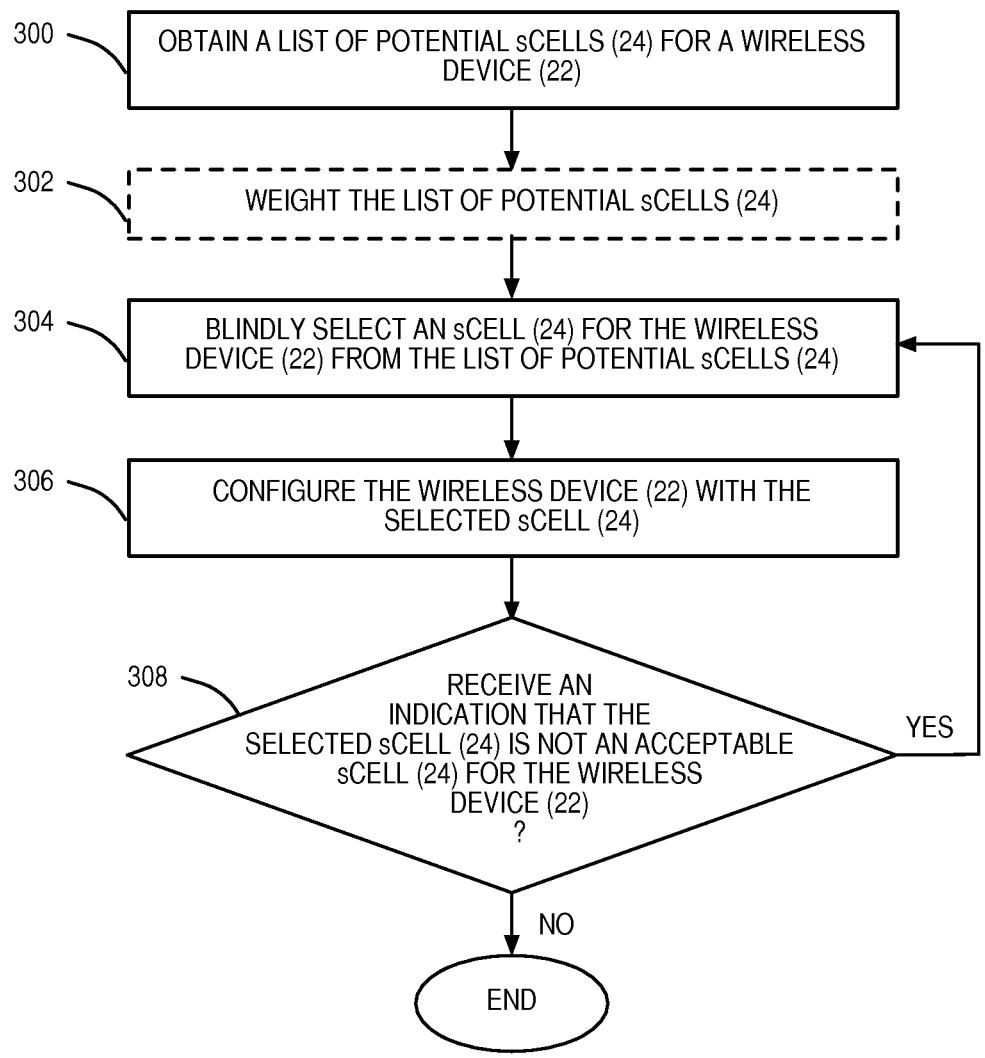
FIG. 5 illustrates the operation of a network node, including receiving an indication that a selected sCell is not acceptable according to one embodiment of the present disclosure.

FIG. 5 illustrates the operation of a network node for selecting one or more of the sCells 24 for the wireless device 22 and configuring the wireless device 22 with the selected sCell(s) 24 according to another embodiment of the present disclosure. This embodiment is similar to those of FIGS. 3 and 4, but in this embodiment, after configuring the wireless device 22 with the selected sCell 24, the network node receives an indication that the selected sCell 24 is not an acceptable sCell 24 for the wireless device 22. As discussed above, the network node obtains a list of potential sCells 24 for the wireless device 22 (step 300), optionally weights the list of potential sCells 24 (step 302), blindly selects an sCell 24 for the wireless device 22 from the list of potential sCells 24 (step 304), and configures the wireless device 22 with the selected sCell 24 (step 306).

Since the configured sCell 24 was blindly selected, it may not be an acceptable sCell 24 for the wireless device 22. If the network node receives an indication from, e.g., the wireless device 22 that the selected sCell 24 is not an acceptable sCell 24 for the wireless device 22 (step 308), the network node returns to step 304 and blindly selects a new sCell 24 for the wireless device 22 from the list of potential sCells 24. Otherwise, the network node ends the sCell 24 selection process. In one embodiment, the indication from the wireless device 22 that the selected sCell 24 is not an acceptable sCell 24 for the wireless device 22 is an indication of an A2 event. In the LTE specifications, an A2 event occurs when a serving cell, which in this example is the selected and configured sCell 24, becomes worse than a threshold, which is referred to herein as an A2 threshold. In another embodiment, the indication from the wireless device 22 that the selected sCell 24 is not an acceptable sCell 24 for the wireless device 22 is an indication that the wireless device 22 failed to connect to the selected sCell 24.

Figure 6:
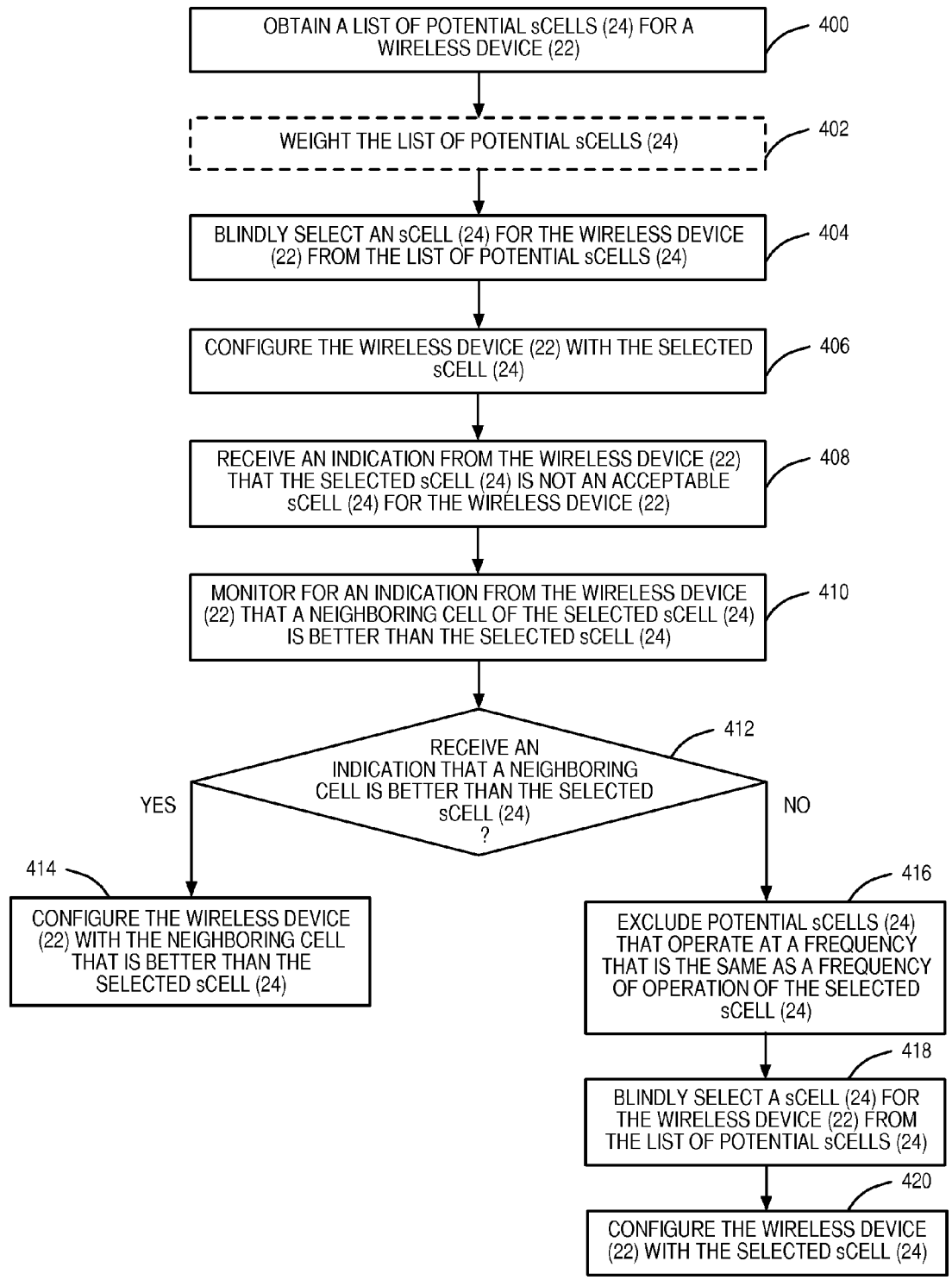
FIG. 6 illustrates the operation of a network node, including the exclusion of potential sCells that operate at a frequency that is the same as a frequency of operation of a selected sCell according to one embodiment of the present disclosure.

FIG. 6 illustrates the operation of a network node for selecting one or more of the sCells 24 for the wireless device 22 and configuring the wireless device 22 with the selected sCell(s) 24 according to another embodiment of the present disclosure. As discussed above, the network node obtains a list of potential sCells 24 for the wireless device 22 (step 400), optionally weights the list of potential sCells 24 (step 402), blindly selects an sCell 24 for the wireless device 22 from the list of potential sCells 24 (step 404), and configures the wireless device 22 with the selected sCell 24 (step 406).

After configuring the wireless device 22 with the selected sCell 24, the network node receives from, e.g., the wireless device 22 an indication that the selected sCell 24 is not an acceptable sCell 24 for the wireless device 22 (step 408). In one embodiment, the indication from the wireless device 22 that the selected sCell 24 is not an acceptable sCell 24 for the wireless device 22 is an indication of an A2 event. In another embodiment, the indication from the wireless device 22 that the selected sCell 24 is not an acceptable sCell 24 for the wireless device 22 is an indication that the wireless device 22 failed to connect to the selected sCell 24. Instead of immediately selecting a new sCell 24 with which to configure the wireless device 22, the network node monitors for an indication from the wireless device 22 that a neighboring cell of the selected sCell 24 is better than the selected sCell 24 (step 410). In one embodiment, the indication that a neighboring cell of the selected sCell 24 is better than the selected sCell 24 is an indication of an A4 event or an A6 event. Receiving either an indication of an A4 event or an indication of an A6 event alerts the network node to the presence of an sCell 24 that is acceptable, whereas the currently selected and configured sCell 24 is not acceptable.

If the network node receives an indication from the wireless device 22 that a neighboring cell of the selected sCell 24 is better than the selected sCell 24 (step 412), the network node configures the wireless device 22 with the neighboring cell that is better than the selected sCell 24 (step 414). Note that in some embodiments, the network node may first determine that the neighboring cell satisfies one or more predefined criteria for serving as an sCell 24 of the wireless device 22. Otherwise, if the network node does not receive an indication from the wireless device 22 that a neighboring cell of the selected sCell 24 is better than the selected sCell 24, e.g., within a predefined amount of time, the network node can deduce that there are no appropriate sCells 24 that operate at a frequency that is the same as the frequency of operation of the currently selected and configured sCell 24. If this deduction were not true, the network node would have received an indication from the currently selected and configured sCell 24 that a neighboring cell was better than the selected sCell 24. The network node then excludes the potential sCells 24 that operate at a frequency that is the same as a frequency of operation of the selected sCell 24 (step 416).

Next, the network node blindly selects a new sCell 24 for the wireless device 22 from the list of potential sCells 24 excluding the potential sCells 24 excluded in step 416 (step 418). As discussed above, since the network node has deduced that there are no acceptable sCells 24 with a frequency of operation that is the same as the frequency of operation of the previously configured sCell 24, this new selection excludes those sCells 24. Depending on how many sCells 24 share this frequency of operation, this exclusion can decrease the amount of time needed to find an acceptable sCell 24 by not configuring these likely unacceptable sCells 24. After blindly selecting a new sCell 24 for the wireless device 22 in step 418, the network node configures the wireless device 22 with the newly selected sCell 24 (step 420). From here, in some embodiments, the process can continue until an acceptable sCell 24 has been selected and configured.

Figure 7:
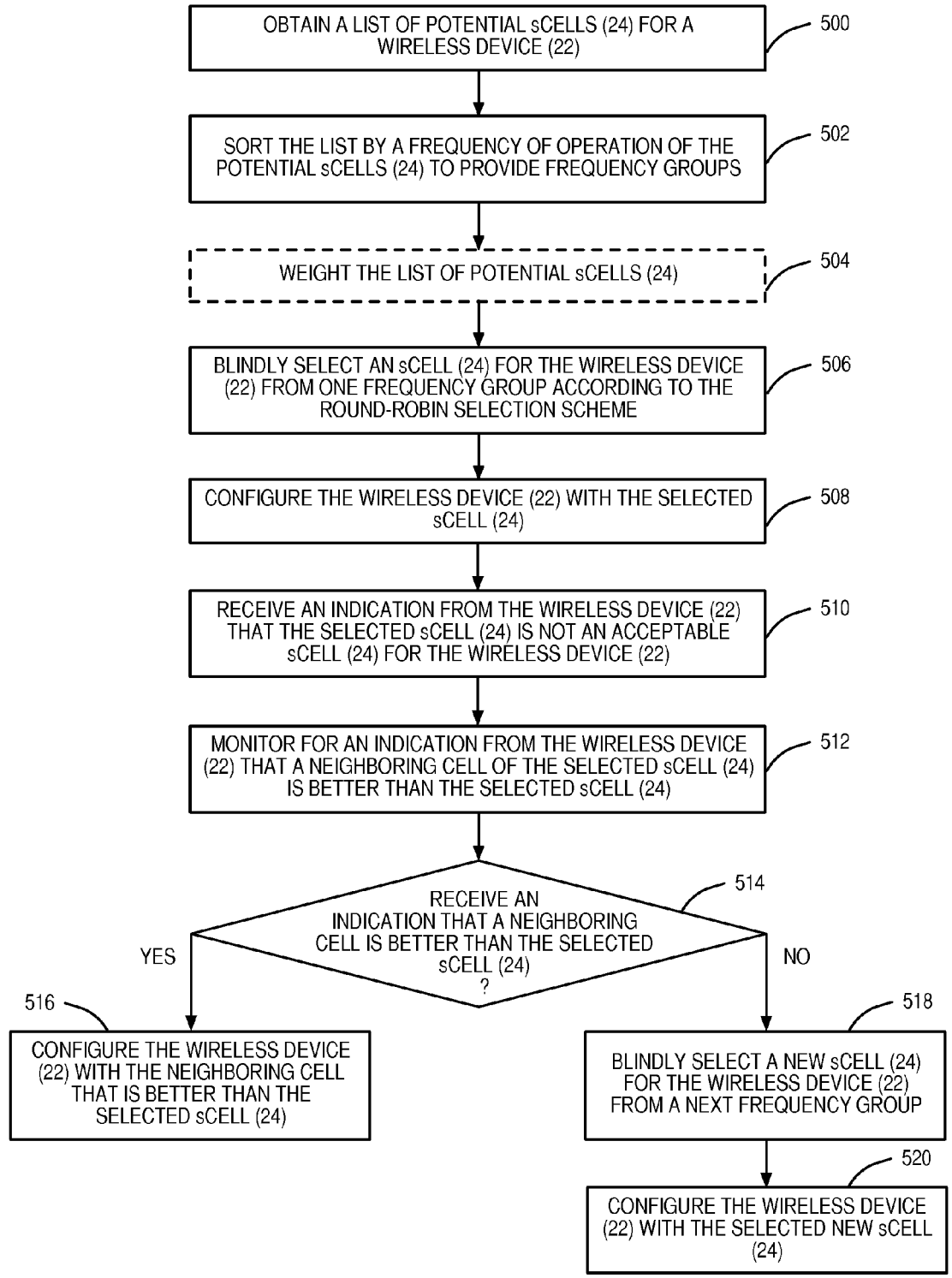
FIG. 7 illustrates the operation of a network node based on a round-robin strategy according to one embodiment of the present disclosure.

FIG. 7 illustrates the operation of a network node for selecting one or more of the sCells 24 for the wireless device 22 and configuring the wireless device 22 with the selected sCell(s) 24 according to another embodiment of the present disclosure. This embodiment is similar to that of FIG. 6, but in the embodiment of FIG. 7, one embodiment of a round-robin selection scheme is utilized.

First, the network node obtains a list of potential sCells 24, as discussed above (step 500). The network node sorts the list of potential sCells 24 by a frequency of operation of the potential sCells 24 to provide resulting frequency groups (step 502). Each frequency group includes one or more sCells 24 having the same frequency of operation and/or frequency band of operation. The sCells 24 within each frequency group can be arranged in any suitable manner. For example, if the network node has further information about a preferred order of selection for the sCells 24, that information can be used to order the sCells 24 within each frequency group.

After sorting the list of potential sCells 24, the network node may optionally weight the list of potential sCells 24 (step 504). This weighting serves to make the selection of one or more sCells 24 more likely and/or to make the selection of one or more sCells 24 less likely. In one embodiment, this weighting can include altering the order of the frequency groups or altering the order of the sCells 24 within each frequency group. The weighting could also include adding one or more duplicate entries into the list of potential sCells 24, or any other suitable method, depending on the implementation of the method.

Next, the network node blindly selects an sCell 24 for the wireless device 22 from the list of potential sCells 24 according to the round-robin selection scheme (step 506). In one embodiment, the round-robin selection scheme is started in the list of potential sCells 24 at a position in the list that is different from a position at which a previous iteration of the round-robin selection scheme for selecting a previous sCell 24 for the wireless device 22 stopped. In one embodiment, the round-robin strategy is started in the list of potential sCells 24 at a position in the list immediately succeeding a position at which a previous iteration of the round-robin strategy for selecting a previous sCell 24 for the wireless device 22 stopped. In one embodiment, the next position in the list to select is maintained as an index of the list of potential sCells 24. In this embodiment, the index can be changed to refer to the next sCell 24 in the list of potential sCells 24 after each blind selection. Starting the selection at a different position in the list avoids selecting an sCell 24 that may have recently been selected as an sCell 24 for a wireless device 22.

In some embodiments, the optional list weighting and the method of blindly selecting the next sCell 24 may be implemented to avoid the problem of load imbalancing. Load imbalancing was discussed in more detail above and occurs when relatively few potential sCells 24 are disproportionately chosen to be configured for the wireless devices 22, while other potential sCells 24 are not chosen. Weighting the list of potential sCells 24 allows the problem of load imbalancing to be avoided by increasing the possibility of choosing potential sCells 24 that are currently used less than other potential sCells 24. The converse may also be used, where the weighting decreases the possibility of choosing potential sCells 24 that are currently used more than other potential sCells 24. These are only some ways in which the list of potential sCells 24 can be weighted.

Additionally, the method of choosing the next sCell 24 to blindly select may be implemented to avoid the problem of load imbalancing. In one embodiment, if the same or a similar list of potential sCells 24 is obtained for more than one wireless device 22, the method of choosing the next sCell 24 to blindly select may choose a random sCell 24 from the list. In this way, the sCells 24 will be configured by the wireless devices 22 in a more balanced way. In an embodiment implementing a round-robin selection strategy where the next sCell 24 to blindly select is the next sCell 24 in the list of potential sCells 24, the starting point in the list of potential sCells 24 may be different for different wireless devices 22. In this way, the sCells 24 will be configured by the wireless devices 22 in a more balanced way. In another embodiment, the list of potential sCells 24 obtained for one wireless device 22 includes sCells 24 that are in an order that is different from an order of potential sCells 24 in another list of potential sCells 24 obtained by another wireless device 22. In this way the sCells 24 will be configured by the wireless devices 22 in a more balanced way.

After blindly selecting an sCell 24 for the wireless device 22, the network node configures the wireless device 22 with the selected sCell 24 (step 508). In this embodiment, after configuring the wireless device 22 with the selected sCell 24, the network node receives an indication that the selected sCell 24 is not an acceptable sCell 24 for the wireless device 22 (step 510). In one embodiment, the indication from the wireless device 22 that the selected sCell 24 is not an acceptable sCell 24 for the wireless device 22 is an indication of an A2 event. In another embodiment, the indication from the wireless device 22 that the selected sCell 24 is not an acceptable sCell 24 for the wireless device 22 is an indication that the wireless device 22 failed to connect to the sCell 24.

Instead of immediately selecting a new sCell 24 with which to configure the wireless device 22, the network node monitors for an indication from the wireless device 22 that a neighboring cell of the selected sCell 24 is better than the selected sCell 24 (step 512). In one embodiment, the indication is an indication of an A4 event or an indication of an A6 event. Receiving either an indication of an A4 event or an indication of an A6 event alerts the network node to the presence of an sCell 24 that is more acceptable than the currently configured sCell 24.

If the network node receives an indication from the wireless device 22 that a neighboring cell of the selected sCell 24 is better than the selected sCell 24 (step 514), the network node configures the wireless device 22 with the neighboring cell that is better than the selected sCell 24 (step 516). Otherwise, if the network node does not receive an indication from the wireless device 22 that a neighboring cell of the selected sCell 24 is better than the selected sCell 24 (step 514), the network node can deduce that there are no appropriate sCells 24 that operate at a frequency that is the same as the frequency of operation of the selected sCell 24. If this deduction were not true, the network node would have received an indication that a neighboring cell was better than the selected sCell 24.

The network node can now exclude the potential sCells 24 that operate at the same as a frequency of operation as the selected sCell 24. Since the list of potential sCells 24 is already sorted by a frequency of operation of the potential sCells 24 to provide frequency groups, excluding the sCells 24 can be accomplished by selecting a new sCell 24 from a different frequency group. In this regard, the network node blindly selects a new sCell 24 for the wireless device 22 from a next frequency group (step 518). In an embodiment where the next sCell 24 to select is maintained by an index of the list of potential sCells 24, the index can be advanced to the first sCell 24 in the next frequency group in the sorted list of potential sCells 24.

As discussed above, since the network node has deduced that there are no acceptable sCells 24 with a frequency of operation that is the same as the frequency of operation of the previously configured sCell 24, this new selection is an sCell 24 with a frequency of operation that is different from the frequency of operation of the previously configured sCell 24. After blindly selecting an sCell 24 for the wireless device 22 from a different frequency group, the network node configures the wireless device 22 with the newly selected sCell 24 (step 520). In some embodiments, the process continues in this manner until an acceptable sCell 24 has been selected and configured for the wireless device 22.

Figure 8:
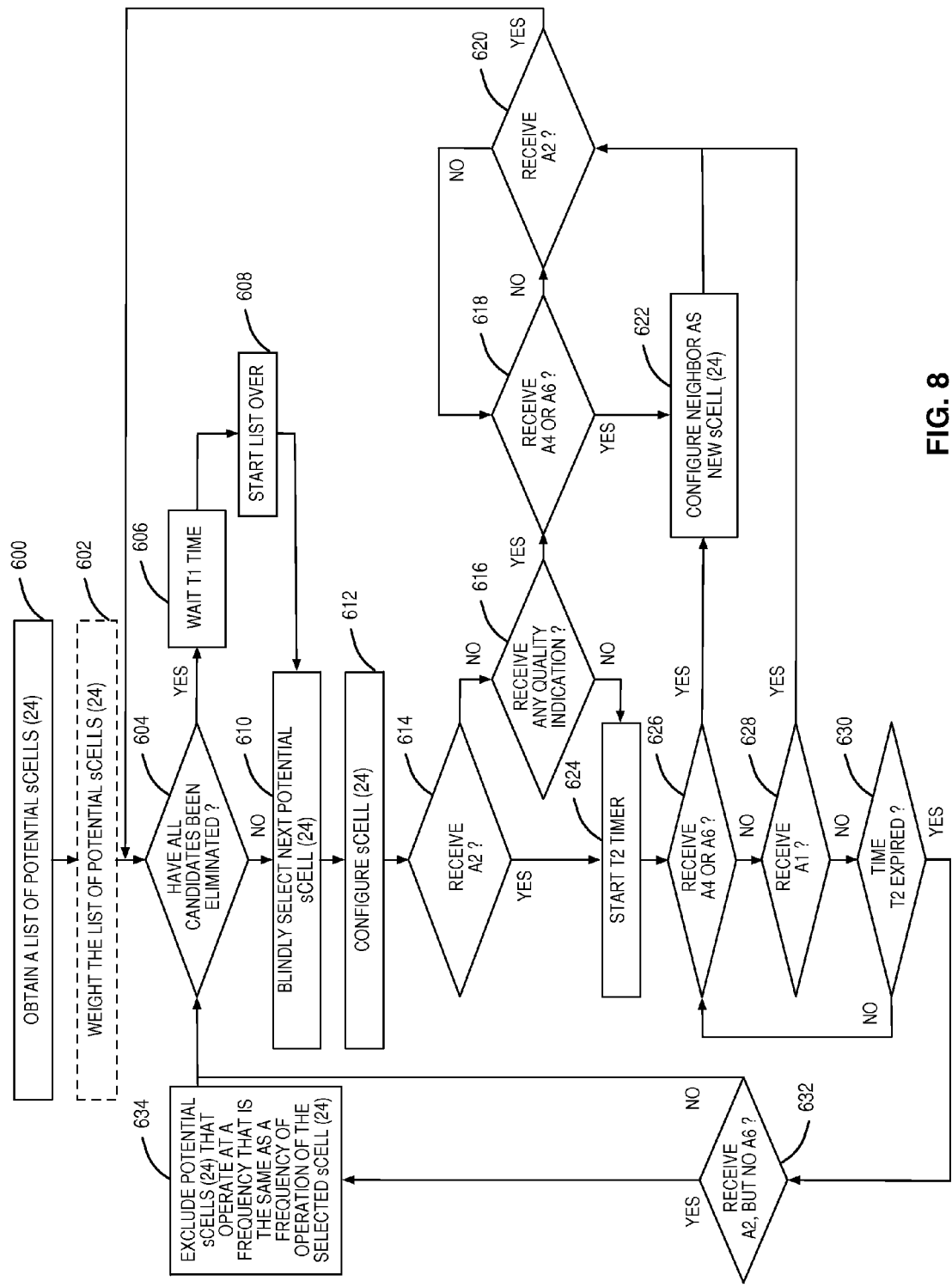
FIG. 8 illustrates the operation of a network node, including specific events according to one embodiment of the present disclosure.

FIG. 8 illustrates the operation of a network node for selecting one or more of the sCells 24 for the wireless device 22 and configuring the wireless device 22 with the selected sCell(s) 24 according to another embodiment of the present disclosure. In this embodiment, specific implementation is described which covers many of the embodiments previously discussed. For clarity and conciseness, FIG. 8 includes references to specific measurement events such as A1, A2, A4, and A6 measurement events. This is merely an exemplary implementation of one embodiment of the current disclosure. In other implementations, other measurement events or notifications could be used.

First, the network node obtains a list of potential sCells 24 (step 600). After obtaining the list of potential sCells 24, the network node may optionally weight the list of potential sCells 24 (step 602). Next, the network node checks if all candidate sCells 24 in the list of potential sCells 24 have been eliminated from consideration (step 604). If all candidate sCells 24 in the list of potential sCells 24 have been eliminated from consideration, the wireless device 22 is currently in a location without acceptable sCell 24 coverage for the wireless device 22. In order to avoid configuring the same potential sCells 24 again when the sCells 24 are unlikely to be acceptable, the network node waits for a timer T1 to expire (step 606). The timer T1 is set to a predefined amount of time, which may vary depending on the particular implementation. In one embodiment, the value of the timer T1 is determined as a tradeoff between power usage during sCell 24 selection and configuration attempts and the desirability of having an acceptable sCell 24 configured for the wireless device 22. In one embodiment, the value of the timer T1 is determined based on a mobility of the wireless device 22. For instance, the value of the timer T1 may be inversely related to the mobility of the wireless device 22 since the more mobile the wireless device 22 is, the more likely the wireless device 22 will enter a location with an acceptable sCell 24. After waiting for the timer T1 to expire, the network node restarts the sCell selection process at a desired location in the list of potential sCells 24 (which may be potentially weighted according to step 602) (step 608). The network node may restart the sCell selection process from any desired position in the list of potential sCells 24. For example, the network node may restart the sCell selection process at a position in the list of potential sCells 24 at which the sCell selection process was previously started before eliminating all of the sCells 24 from consideration. Alternatively, once the timer T1 has expired, the process may return to step 600.

At this point, whether proceeding from step 604 (all candidate sCells 24 in the list of potential sCells 24 have not been eliminated from consideration) or step 608 (restarting the list), the network node blindly selects an sCell 24 for the wireless device 22 from the list of potential sCells 24 (step 610). As discussed above, in one embodiment, the blind selection may be according to a round-robin selection scheme. However, other blind selection schemes, e.g., random selection, may be used. After blindly selecting an sCell 24 for the wireless device 22, the network node configures the wireless device 22 with the selected sCell 24 (step 612).

After configuring the wireless device 22 with the selected sCell 24, the network node determines whether an indication of an A2 event has been received from the wireless device 22 (step 614). In the LTE specifications, an A2 event occurs when a serving cell, which in this case is the selected and configured sCell 24, becomes worse than an A2 threshold. Receiving an indication of an A2 event means that the selected and configured sCell 24 is not an acceptable sCell 24 for the wireless device 22. Conversely, if an indication of an A2 event is not received, one of two conditions exist, namely: (1) the selected and configured sCell 24 is an acceptable sCell 24 for the wireless device 22, or (2) for some reason, the network node has not and will not receive an indication of any event (A1, A2, A4, or A6) from the wireless device 22 for the selected and configured sCell 24.

In order to determine which of these two conditions exists, if the network node does not receive an A2 event, the network node checks whether any quality indication has been received from the wireless device 22 regarding the selected sCell 24 (step 616). In one embodiment, the quality indication is an indication of an A1 event, an indication of an A4 event, or an indication of an A6 event. In the LTE specifications, an A1 event occurs when the selected sCell 24 becomes better than a threshold, which is referred to herein as an A1 threshold.

If the network node does not receive an A2 event, but does receive some other quality indication from the wireless device 22 regarding the selected sCell 24, the selected sCell 24 is considered an acceptable sCell 24 for the wireless device 22. In this case, the network node enters a loop where the network node monitors the wireless device 22 to determine whether the selected and configured sCell 24 subsequently becomes non-acceptable or a better neighbor cell becomes available. More specifically, in this embodiment, the network node determines whether an indication of an A4 or an A6 event has been received from the wireless device 22 for the selected and configured sCell 24 (step 618). Receiving an indication of either an A4 event or an A6 event alerts the network node to the presence of a neighboring cell of the currently selected and configured sCell 24 that is better than the currently selected and configured sCell 24.

If an indication of an A4 event or an A6 event has not been received, the network node determines whether an indication of an A2 event has been received from the wireless device 22 for the currently configured and selected sCell 24 (step 620). If an indication of an A2 event has been received, the process returns to step 604 and is repeated for selection of a new sCell 24 for the wireless device 22. Notably, at this point, the previously selected and configured sCell 24 may be deconfigured. If an indication of an A2 event has not been received, the process returns to step 618. At step 618, if the network node receives an indication of either an A4 event or an A6 event, the network node configures the wireless device 22 with the neighboring cell that is better than the selected sCell 24 (step 622). In other words, the neighboring cell is selected and configured as a new sCell 24 for the wireless device 22. In some embodiments, the previously selected and configured sCell 24 may be deconfigured. From step 622, the process proceeds to step 620 and is performed for the newly selected and configured sCell 24 of the wireless device 22.

Returning now to the discussion of steps 614 and 616, if the network node does receive an indication of an A2 event from the wireless device 22 for the selected and configured sCell 24 in step 614, or if the network node did not receive any quality indication from the wireless device 22 regarding the sCell 24 in step 616, the network node starts a timer T2 (step 624). In one embodiment, the timer T2 is intended to allow for more information about the configured sCell 24 to be received from the wireless device 22. As with the previously described timer T1, the duration of the timer T2 may be implementation-specific. A larger value for the timer T2 leaves the wireless device 22 configured with an unacceptable sCell 24 for a longer time. In contrast, a smaller value for the timer T2 may cause the network node to miss one or more additional measurement reports that the wireless device 22 might have sent regarding the selected and configured sCell 24. A balance between these two factors will be implementation-specific and may depend on the network architecture, capabilities of the wireless device 22, or any other factor.

While the timer T2 is running and before the timer T2 expires, the network node determines whether an indication of either an A4 event or an A6 event has been received from the wireless device 22 for the selected and configured sCell 24 (step 626). If the network node receives an indication of either an A4 event or an A6 event, the network node configures the wireless device 22 with the neighboring cell that is better than the selected sCell 24 (step 622). Otherwise, the network node determines whether an indication of an A1 event has been received from the wireless device 22 for the currently selected and configured sCell 24 (step 628). Receiving an indication of an A1 event indicates that the sCell 24 is now an acceptable sCell 24 for the wireless device 22. If the network node does receive an indication of an A1 event, the network node considers the sCell 24 to now be acceptable, and the process proceeds to step 620.

If no measurement reports are received in steps 626 and 628, the network node determines whether the timer T2 has expired (step 630). If the timer T2 has not expired, the process returns to step 626 such that steps 626 and 628 are repeated to continue to monitor for either an A4 or A6 event, or for an A1 event. Once the timer T2 has expired, the network node determines whether an A2 event was received but an A6 event was not received (step 632). If an A2 event was received but an A6 event was not received, the network node can deduce that there are no appropriate sCells 24 that operate at the same frequency of operation as the currently selected and configured sCell 24. If this deduction were not true, there should have been an indication that the neighboring cell was better than the selected sCell 24. Thus, if an indication of an A2 event was received but an indication of an A6 event was not received, the network node excludes the potential sCells 24 that operate at a frequency that is the same as a frequency of operation of the selected sCell 24 (step 634). In some embodiments where the list of potential sCells 24 is sorted by frequency of operation of the sCells 24 (e.g., in an embodiment of a round-robin selection strategy), excluding the potential sCells 24 that operate at a frequency that is the same as a frequency of operation of the selected sCell 24 may involve advancing the selection process to a point in the list where sCells 24 operating at a different frequency are located.

Whether or not the network node skips to the next frequency in the list of potential sCells 24, the process returns to step 604, where the network node checks if all candidate sCells 24 in the list of potential sCells 24 have been eliminated from consideration. The process continues in this manner.

Several blind selection based sCell selection processes are described above. While these blind selection based sCell selection processes have many benefits and advantages, less than optimal performance may occur when there is a large number of potential, or candidate, sCells on multiple carrier frequencies. In this case, there is the potential that several or many blind selects will be performed before selecting a suitable sCell. In this regard, embodiments of a statistics-assisted sCell selection process are described below. In these embodiments, statistics indicative of correlation between source cells and successful, or suitable, sCells are collected and utilized to identify the carrier frequency(ies) that are most likely to have a successful sCell for a wireless device and/or the sCell that is most likely to be a successful sCell for a wireless device. In this manner, performance can be improved.

Figure 9:
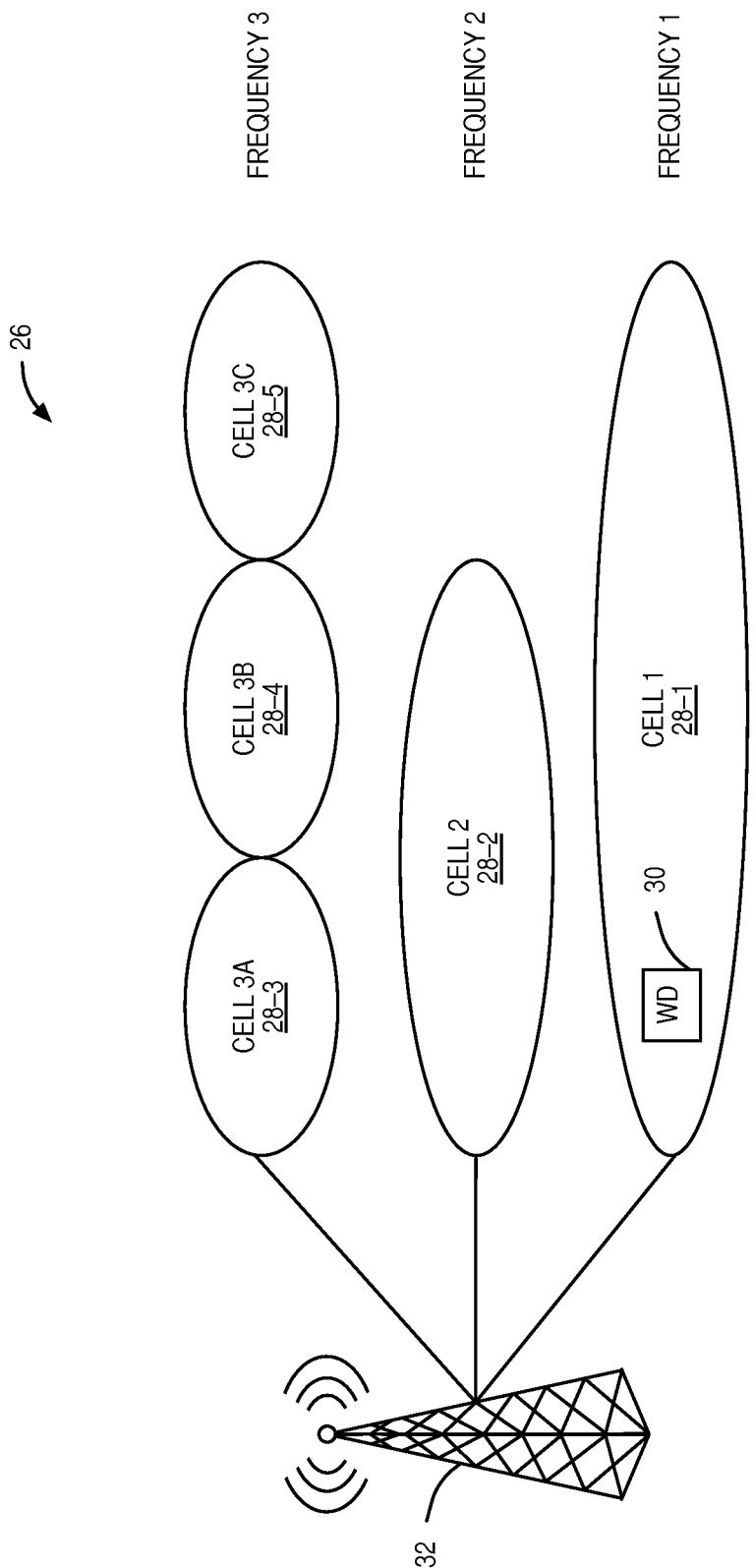
FIG. 9 illustrates one example of a cellular communications network according to another embodiment of the present disclosure.

FIG. 9 illustrates another example of a cellular communications network 26 according to one embodiment of the present disclosure. In this example, the cellular communications network 26 includes a number of cells 28-1 through 28-5 (generally referred to herein collectively as cells 28 and individually as cell 28), where the cell 28-1 operates on a first carrier frequency (F1), the cell 28-2 operates on a second carrier frequency (F2), and cells 28-3 through 28-5 operate on a third carrier frequency (F3). Further, each of the cells 28-1 through 28-5 is, in this example, capable of operating as either a pCell or an sCell. For instance, for a wireless device 30, the cell 28-1 may be configured as the pCell for the wireless device 30, and the cells 28-2 and 28-3 may be configured as sCells for the wireless device 30. Note that while the cells 28-1 through 28-5 are illustrated separate from one another to highlight the different carrier frequencies, the cells 28-1 through 28-5 have complete or partially overlapping coverage areas. In this example, all of the cells 28-1 through 28-5 are served by a base station 32 (e.g., an eNB). However, some of the cells 28 (e.g., the cells 28-3 through 28-5) may be served by RRHs.

As discussed below in detail, sCell selection is performed either with or without measurements such as, e.g., L3 measurements before sCell selection. However, in order to improve the sCell selection process, a network node (e.g., the base station 32) collects statistics indicative of correlation between source cells (e.g., pCells) and successful sCells. More specifically, using the cell 28-1 as an example, the network node collects statistics indicative of which of the other cells 28-2 through 28-5 are most likely to be successful sCells for wireless devices 30 connected to the cell 28-1 (e.g., wireless devices 30 configured with the cell 28-1 as their pCell). In the same manner, the network node collects statistics for the cell 28-2 that are indicative of which of the other cells 28-1 and 28-3 through 28-5 are most likely to be successful sCells for wireless devices 30 connected to the cell 28-2 (e.g., wireless devices 30 configured with the cell 28-2 as their pCell). Likewise, for the cell 28-3, the network node collects statistics indicative of which of the other cells 28-1, 28-2, 28-4, and 28-5 that are most likely to be successful sCells for wireless devices 30 connected to the cell 28-3 (e.g., wireless devices 30 configured with the cell 28-3 as their pCell). For the cell 28-4, the network node collects statistics indicative of which of the other cells 28-1 through 28-3 and 28-5 that are most likely to be successful sCells for wireless devices 30 connected to the cell 28-4 (e.g., wireless devices 30 configured with the cell 28-4 as their pCell). Lastly, for the cell 28-5, the network node collects statistics indicative of which of the other cells 28-1 through 28-4 that are most likely to be successful sCells for wireless devices 30 connected to the cell 28-5 (e.g., wireless devices 30 configured with the cell 28-5 as their pCell).

In some embodiments, the statistics are collected from wireless devices 30 that are configured with the corresponding cells 28 as their sCells based on, e.g., measurement reports from the wireless devices 30 and/or whether the wireless devices 30 are able to successfully transmit or receive on the configured sCells. In addition, in some embodiments, the statistics may be collected from wireless devices 30 that do not have carrier aggregation capabilities (e.g., based on measurement reports received from those wireless devices 30 that are indicative of cells 28 that would be successful sCells).

The network node uses the collected statistics to assist in sCell selection. The sCell selection may be a selection process that is not based on measurements (e.g., L3 measurements) similar to the embodiments described above, wherein the statistics are utilized to select a carrier frequency (e.g., F1, F2, or F3) that is most likely to have a successful sCell for a particular wireless device 30 and/or cell(s) 28 that are most likely to be successful sCells for a particular wireless device 30. The sCell selection processes described herein that are not based on measurements are referred to herein as "measurement-free" sCell selection processes. However, in another embodiment, the sCell selection is performed using a measurement-based sCell selection process. More specifically, in one embodiment, the statistics are utilized to select a carrier frequency (e.g., F1, F2, or F3) that is most likely to have a successful sCell for a particular wireless device 30. A measurement-based sCell selection process may then be performed on the selected carrier frequency to thereby select one or more of the cells 28 on the selected carrier as an sCell(s) for the wireless device 30. Thus, for both measurement-free selection and measurement-based selection, the statistics can be used to more efficiently select one or more of the cells 28 as an sCell(s) for the wireless device 30.

Figure 10:
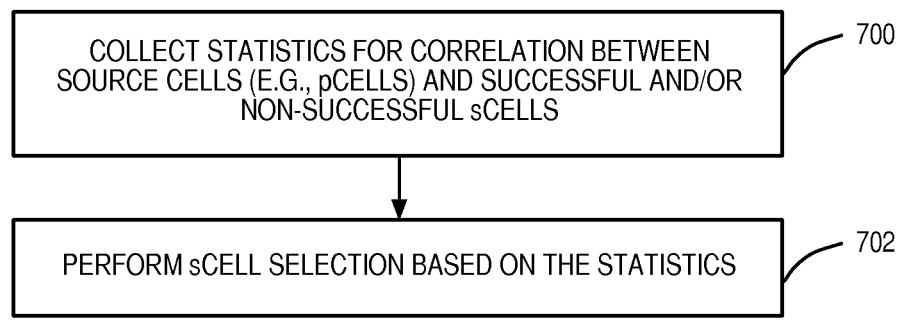
FIG. 10 is a flow chart that illustrates a statistics-based sCell selection process according to one embodiment of the present disclosure.

FIG. 10 is a flow chart that illustrates a statistics-assisted sCell selection process according to one embodiment of the present disclosure. This process is performed by a network node such as, but not limited to, the base station 32. As illustrated, the network node collects statistics indicative of correlation between source cells (e.g., pCells) and successful and/or non-successful sCells (step 700). As used herein, a source cell is a cell 28 to which a wireless device 30 is connected (e.g., as a pCell of the wireless device 30), and the correlation between the source cell and successful sCells is indicative of which other cells 28 that either have been or would have been successful sCells for wireless devices 30 connected to the source cell. In one embodiment, the source cells are cells 28 that can operate as pCells, and the statistics are indicative of correlation between pCells and successful sCells. For example, considering the cell 28-1, the statistics may include statistics indicative of which of the other cells 28-2 through 28-5 are likely to be successful sCells for wireless devices 30 configured with the cell 28-1 as their pCell.

In another embodiment, the source cells are not limited to pCells but can more generally be any cell that the UE is connected to. In this case, the statistics are indicative of correlation between the connected cells and successful sCells. For example, considering the cell 28-2, the statistics may include statistics indicative of which of the other cells 28-1 and 28-3 through 28-5 are likely to be successful sCells for wireless devices 30 connected to the cell 28-2 as, e.g., either a pCell or an sCell. Thus, if, for example, the wireless device 30 is configured with the cell 28-1 as a pCell and the cell 28-2 as an sCell, the statistics may be indicative of which of the other cells 28-3 through 28-5 are likely to be successful sCells for the wireless device 30 when connected to the cell 28-2 (i.e., the smaller of the two connected cells of the wireless device 30).

The network node then uses the statistics to perform sCell selection (step 702). More specifically, in some embodiments, the sCell selection may be a measurement-free selection process similar to the embodiments described above wherein the statistics are utilized to select a carrier frequency (e.g., F1, F2, or F3) that is most likely to have a successful sCell and/or cell(s) 28 that are most likely to be successful sCells. However, in another embodiment, the sCell selection is performed using a measurement-based sCell selection process. More specifically, in one embodiment, the statistics are utilized to select a carrier frequency (e.g., F1, F2, or F3) that is most likely to have a successful sCell. A measurement-based sCell selection process may then be performed on the selected carrier frequency.

Figure 11:
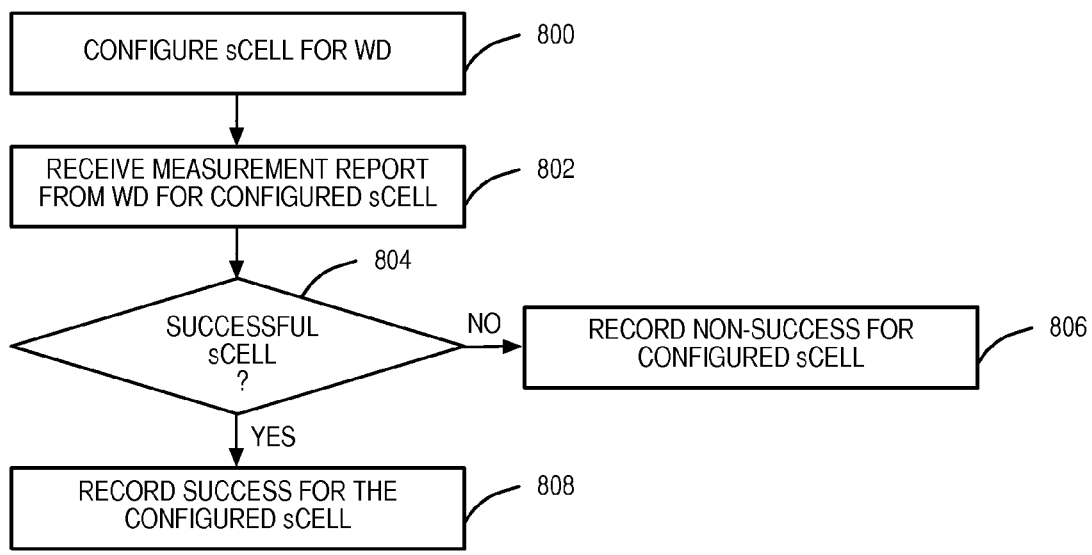
FIG. 11 illustrates a process for collecting statistics according to one embodiment of the present disclosure.

FIG. 11 illustrates a process for collecting statistics according to one embodiment of the present disclosure. This process is performed by a network node such as, but not limited to, the base station 32. As illustrated, the network node configures one of the cells 28 as an sCell for the wireless device 30 (step 800). Note that, in some embodiments, an sCell selection attempt is recorded upon configuring the cell 28 as an sCell for the wireless device 30. The selection attempt is recorded for a source cell of the wireless device 30. In one embodiment, the source cell of the wireless device 30 is one of the cells 28 that is configured as a pCell of the wireless device 30. Thus, a selection attempt is recorded for the cell 28 as an attempted sCell selection for the pCell of the wireless device 30. However, in another embodiment, the source cell is any cell 28 to which the wireless device 30 is connected (e.g., either a pCell or a successful or configured sCell of the wireless device 30). In this case, a selection attempt is recorded for the cell 28 as an attempted sCell selection for the source cell of the wireless device 30.

Thereafter, the network node receives a measurement report from the wireless device 30 for the cell 28 configured as an sCell of the wireless device 30 (step 802). The measurement report includes one or more measurements indicative of the suitability of the cell 28 to operate as an sCell of the wireless device 30. For example, the measurement report may include one or more downlink signal quality measurements (e.g., Reference Signal Received Power (RSRP) or Reference Signal Received Quality (RSRQ)) for the cell 28. Based on the measurement report, the network node determines whether the cell 28 is a successful, or suitable, sCell for the wireless device 30 (step 804). In one embodiment, the network node determines whether the cell 28 is a successful sCell for the wireless device 30 based on a quality of the cell 28 as indicated by the measurement report (e.g., successful if the quality is better than a threshold and non-successful if the quality is worse than the threshold). In one particular example, if the measurement report is indicative of an A1 event on the cell 28 configured as the sCell of the wireless device 30, then the cell 28 may be determined to be a successful sCell. Conversely, if the measurement report is indicative of an A2 event on the cell 28 configured as the sCell of the wireless device 30, then the cell 28 may be determined to be a non-successful sCell. If the cell 28 is a non-successful sCell, the network node records a non-success or failure for the cell 28 as an sCell for the source cell of the wireless device 30 (step 806). Otherwise, if the cell 28 is determined to be a successful sCell, a success is recorded for the cell 28 as an sCell for the source cell of the wireless device 30 (step 808).

Figure 12:
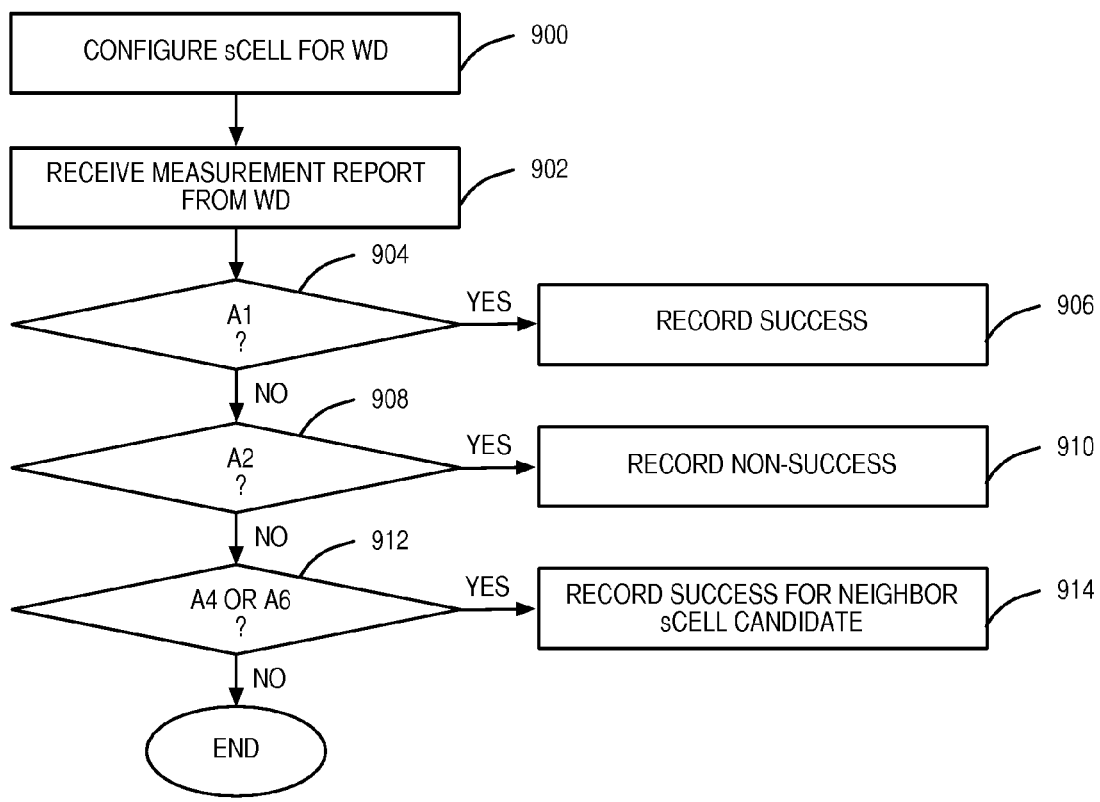
FIG. 12 illustrates a process for collecting statistics according to another embodiment of the present disclosure.

FIG. 12 illustrates a process for collecting statistics according to another embodiment of the present disclosure. This process is performed by a network node such as, but not limited to, the base station 32. As illustrated, the network node configures one of the cells 28 as an sCell for the wireless device 30 (step 900). Note that, in some embodiments, an sCell selection attempt is recorded upon configuring the cell 28 as an sCell for the wireless device 30. The selection attempt is recorded for a source cell of the wireless device 30. In one embodiment, the source cell of the wireless device 30 is one of the cells 28 that is configured as a pCell of the wireless device 30. Thus, a selection attempt is recorded for the cell 28 as an attempted sCell selection for the pCell of the wireless device 30. However, in another embodiment, the source cell is any cell 28 to which the wireless device 30 is connected (e.g., either a pCell or a successful or configured sCell of the wireless device 30). In this case, a selection attempt is recorded for the cell 28 as an attempted sCell selection for the source cell of the wireless device 30.

Thereafter, the network node receives a measurement report from the wireless device 30 for the cell 28 configured as an sCell of the wireless device 30 (step 902). In this embodiment, the cellular communications network 26 is an LTE network, and the measurement report includes one or more measurements indicative of one or more measurement events (e.g., an A1 event, an A2 event, an A4 event, or an A6 event). The network node determines whether an A1 event has occurred for the cell 28 configured as an sCell of the wireless device 30 (step 904). If so, the network node records a success for the cell 28 with respect to the source cell of the wireless device 30 (step 906). If not, the network node determines whether an A2 event has occurred for the cell 28 configured as an sCell of the wireless device 30 (step 908). If so, the network node records a non-success, or failure, for the cell 28 with respect to the source cell of the wireless device 30 (step 910). In one embodiment, if an A2 event has not occurred, the network node determines whether an A4 or A6 event has occurred for the cell 28 configured as an sCell of the wireless device 30 (step 912). If so, the network node records a success for a corresponding neighbor cell of the cell 28 configured as an sCell of the wireless device 30 (step 914). In this manner, if a neighbor cell of the cell 28 configured as an sCell of the wireless device 30 could be used as a successful sCell, this is recorded by the network node as a success for that neighbor cell. The process then ends.

Note that the process of FIG. 12 assumes that a measurement report is received for the configured sCell. However, in some instances, a measurement report may never be received from the configured sCell. Thus, in some embodiments, the network node records a non-success or failure for the configured sCell if a measurement report is not received within some predefined amount of time. It should be also noted that while the steps of FIG. 12 (and other figures described herein) are illustrated and numbered as being performed in a particular order, the steps may be performed in any order unless explicitly or otherwise required.

Figure 13:
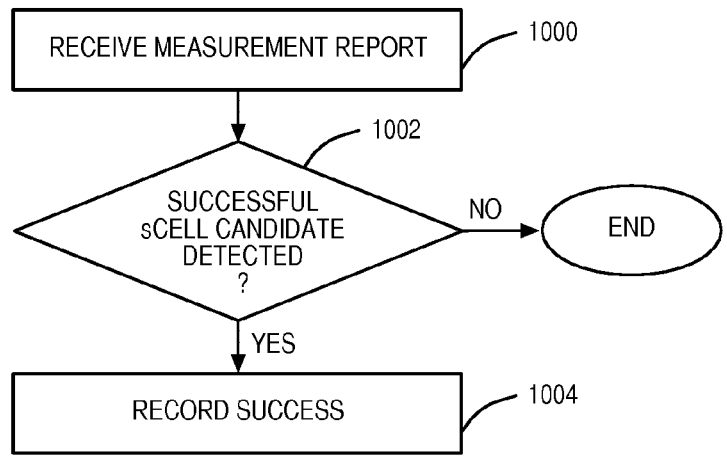
FIG. 13 illustrates a process for collecting statistics according to another embodiment of the present disclosure.

The embodiments of FIGS. 11 and 12 relate to collecting statistics from wireless devices 30 upon configuring sCells for the wireless devices 30. However, the statistics may additionally or alternatively be collected from wireless devices 30 whether or not those wireless devices 30 are configured with sCells or even capable of performing carrier aggregation. For instance, FIG. 13 illustrates one example process for collecting statistics from a wireless device 30 for potential sCells regardless of whether the wireless device 30 is configured with an sCell or even capable of carrier aggregation. As illustrated, the network node receives a measurement report from a wireless device 30 for a source cell of the wireless device 30 (step 1000). Based on the measurement report, the network node determines whether a neighbor cell of the source cell is a successful sCell candidate for the source cell (step 1002). For example, for LTE, the network node may determine whether an A4 or an A6 event has occurred for a neighbor cell of the source cell. If so, that neighbor cell is determined to be a successful sCell candidate. If a successful sCell candidate is detected, the network node records a success for the successful sCell candidate with respect to the source cell of the wireless device 30 (step 1004). If a successful sCell candidate is not detected, the process ends.

Figure 14:
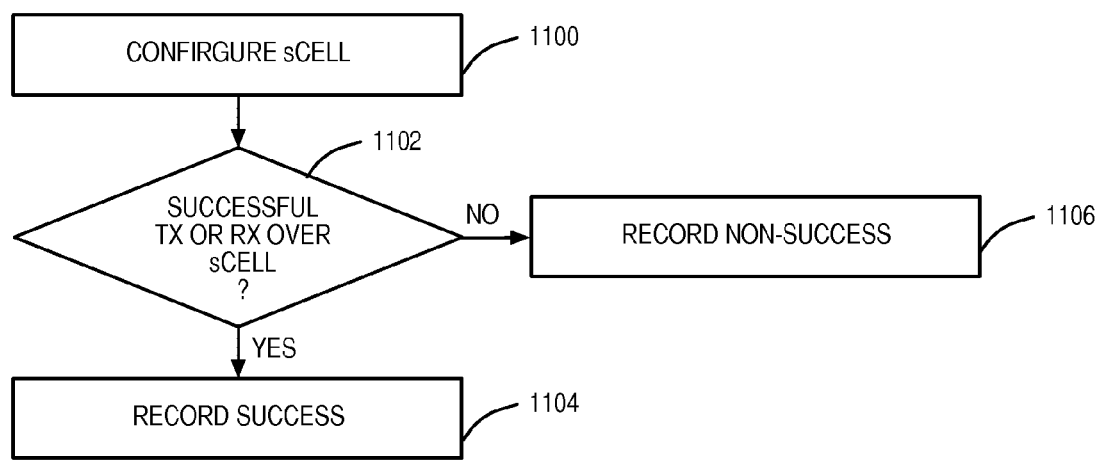
FIG. 14 illustrates a process for collecting statistics according to another embodiment of the present disclosure.

In the embodiment above, the statistics are collected based on measurement reports. However, the present disclosure is not limited thereto. In this regard, FIG. 14 illustrates a process for collecting statistics based on whether successful transmission or reception occurs on a configured sCell according to one embodiment of the present disclosure. This process is performed by a network node such as, but not limited to, the base station 32. As illustrated, the network node configures one of the cells 28 as an sCell for the wireless device 30 (step 1100). Note that, in some embodiments, an sCell selection attempt is recorded upon configuring the cell 28 as an sCell 28 for the wireless device 30. The selection attempt is recorded for a source cell of the wireless device 30. In one embodiment, the source cell of the wireless device 30 is one of the cells 28 that is configured as a pCell of the wireless device 30. Thus, a selection attempt is recorded for the cell 28 as an attempted sCell selection for the pCell of the wireless device 30. However, in another embodiment, the source cell is any cell 28 to which the wireless device 30 is connected (e.g., either a pCell or a successful or configured sCell of the wireless device 30). In this case, a selection attempt is recorded for the cell 28 as an attempted sCell selection for the source cell of the wireless device 30.

Thereafter, the network node determines whether successful transmission to or reception for the wireless device 30 occurs on the configured sCell within a predetermined amount of time (step 1102). If so, the network node records a success for the cell 28 with respect to the source cell of the wireless device 30 (step 1104). If not, the network node records a non-success, or failure, for the cell 28 with respect to the source cell of the wireless device 30 (step 1106).

Figure 15A:
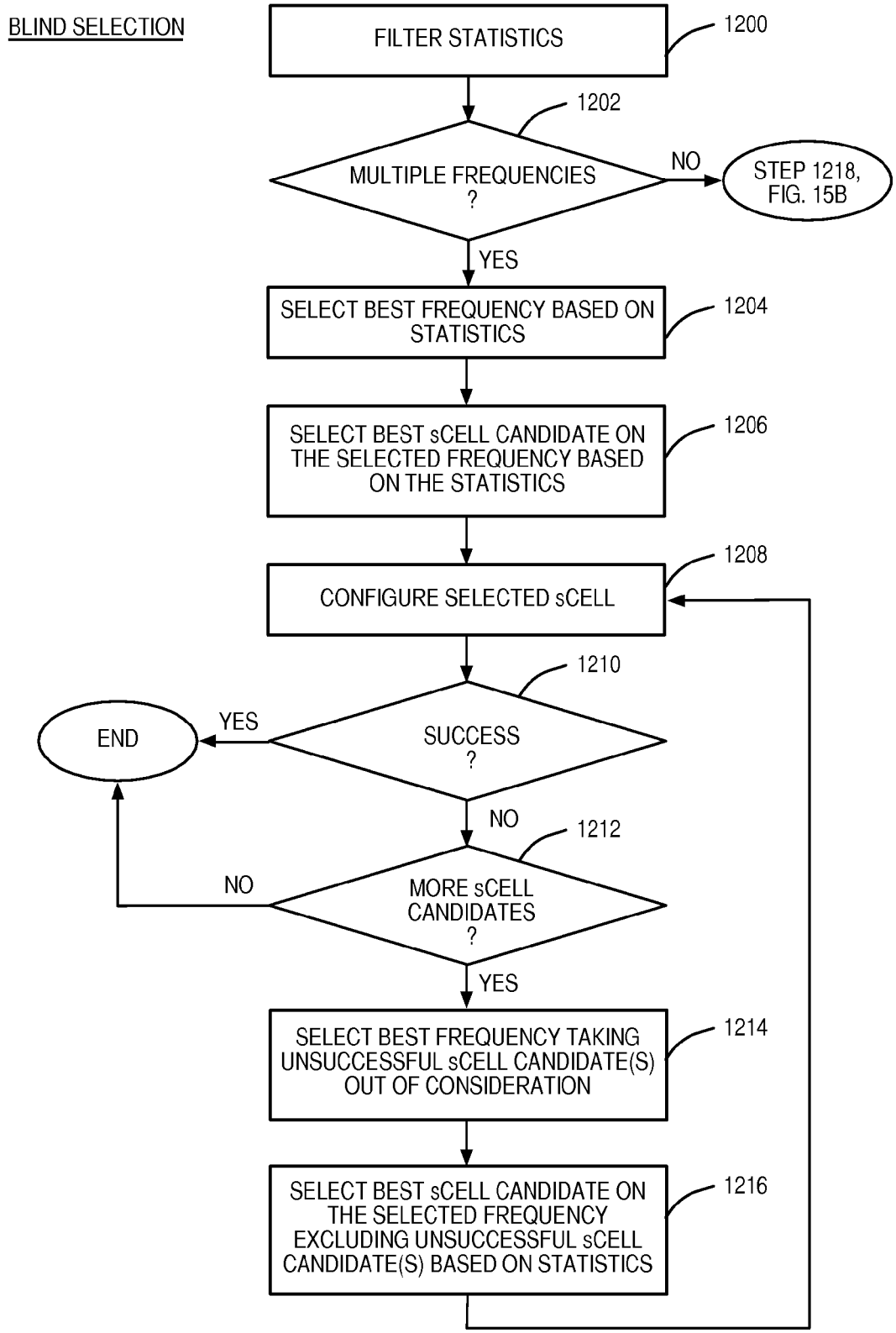
FIGS. 15A and 15B illustrate a statistics-assisted sCell selection process according to one embodiment of the present disclosure.
Figure 15B:
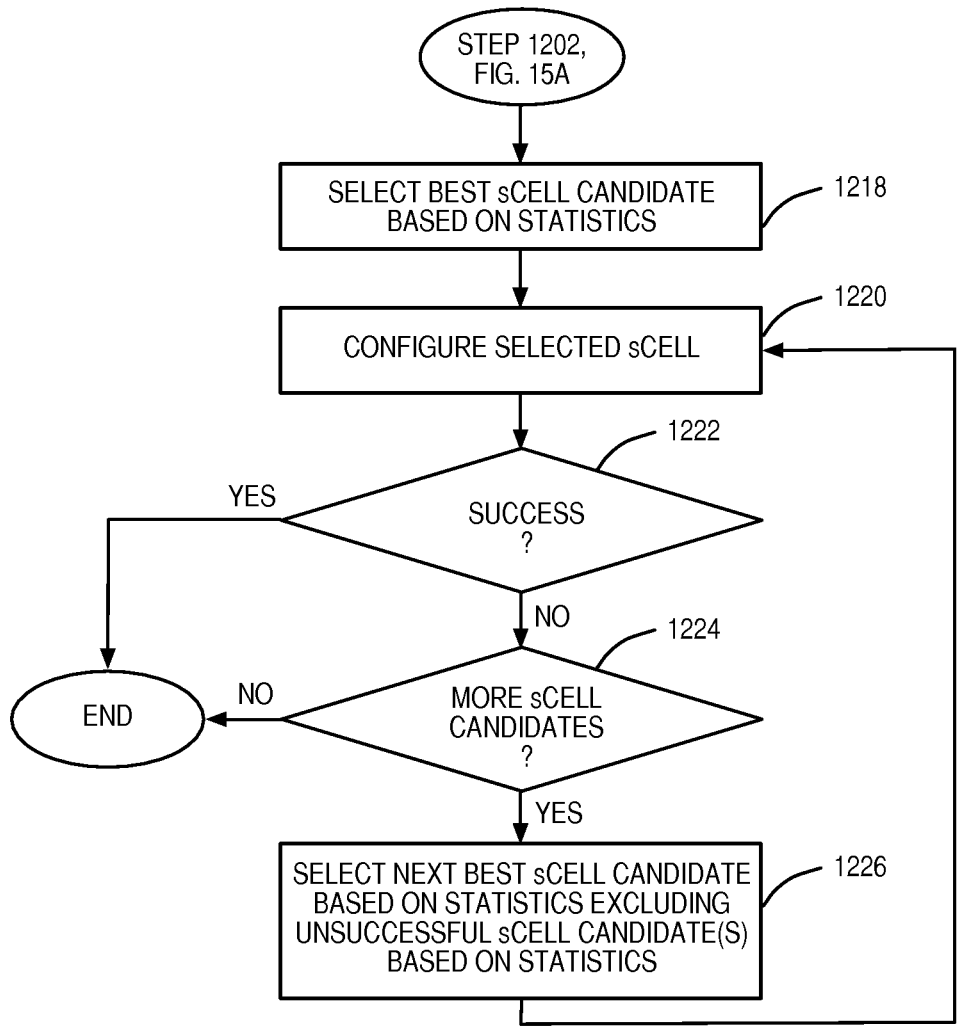

FIGS. 11-14 describe embodiments for collecting the statistics. FIGS. 15A, 15B, 16A, and 16B illustrate two examples of statistics-assisted sCell selection processes. In particular, FIGS. 15A and 15B illustrate a statistics-assisted sCell selection process that utilizes measurement-free selection according to one embodiment of the present disclosure. This process is performed by a network node such as, but not limited to, the base station 32. Notably, not all of the illustrated steps are performed in all embodiments. When a wireless device 30 connects to a pCell and more than one candidate sCell exists, the network node performs an sCell selection process, which in this example is the process of FIGS. 15A and 15B. For this discussion, the pCell is the cell 28-1 and, as such, the cell 28-1 is referred to as pCell 28-1.

As illustrated, in some embodiments, the network node filters the statistics (step 1200). Filtering of the statistics may be applied in order to adapt the statistics to the particular sCell selection process. For example, in one embodiment, the filtering process calculates a success rate for a specific carrier frequency(ies) (e.g., ratio of total number of successes over the carrier frequency to total number of sCell selection attempts over the carrier frequency) and/or a success rate for a specific candidate sCell(s) with respect to the source cell of the wireless device 30 (e.g., the pCell) (e.g., ratio of successes to sCell selection attempts). Then, only the carrier frequency(ies) and/or candidate sCell(s) having success rates above a threshold may be considered for sCell selection. In one embodiment, if the success rate for a particular candidate sCell is below a threshold, the network node may remove that candidate sCell from the candidate sCells in general or from the candidate sCells for the wireless device 30. Filtering of the statistics may additionally or alternatively include removing any candidate sCells that are already configured as an sCell for the wireless device 30.

In this embodiment, the network node determines whether there are candidate sCells for the wireless device 30 on multiple carrier frequencies (step 1202). If so, the network node selects a best carrier frequency for sCell selection for the wireless device 30 based on the (filtered) statistics (step 1204). In general, the best carrier frequency is a carrier frequency on which there is a best possibility (e.g., best probability) of selecting a successful sCell for the wireless device 30 as determined based on the statistics. More specifically, in one embodiment, the network node determines a total success rate for each possible carrier frequency, and the best carrier frequency is the carrier frequency having the highest success rate. The total success rate for a carrier frequency is calculated as, in one embodiment, a ratio of the sum of the number of successes for all candidate sCells on the carrier frequency over the sum of the number of sCell selection attempts for all of the candidate sCells on the carrier frequency. If two or more of the carrier frequencies have the same total success rate, the network node may select one of them, e.g., randomly.

Once the best carrier frequency is selected, the network node selects a best sCell from the candidate sCells on the selected carrier frequency based on the statistics (step 1206). In general, the best sCell is the candidate sCell having the best possibility (e.g., best probability) of being a successful sCell for the wireless device 30 as determined based on the statistics. In one embodiment, the best sCell is the candidate sCell on the carrier frequency having the highest success rate. The network node then configures the selected sCell as an sCell of the wireless device 30 (step 1208). Thereafter, the network node determines whether the configured sCell is a successful sCell for the wireless device 30 (step 1210). More specifically, in one embodiment, the network node receives a measurement report from the wireless device 30 for the configured sCell and determines whether the configured sCell is successful based on the measurement report (e.g., an A1 event indicates a success and an A2 event or no measurement report indicates a non-success). In another embodiment, the network node determines whether the configured sCell is a success based on whether a successful transmission or reception occurs on the configured sCell. While not illustrated, the network node updates the statistics for the configured sCell based on the result of the determination in step 1210, as described above.

If the configured sCell is successful, the process ends. Otherwise, the network node determines whether there are more candidate sCells (step 1212). If not, the process ends. Otherwise, the network node selects a best carrier frequency when taking the non-successful sCell(s) from the previous iteration(s) of the process out of consideration (step 1214). For example, for the first iteration of step 1214, the network node determines the total success rate for each carrier frequency excluding the success rate of the previously configured and unsuccessful sCell. The carrier frequency with the best, or highest, total success rate is then selected. In a similar manner, the network node then selects the best candidate sCell from the candidate sCells on the selected carrier frequency excluding the previously configured and unsuccessful sCell(s) (step 1216). At that point, the process returns to step 1208 and is repeated until either a successful sCell is selected or all of the candidate sCells have been processed.

Returning to step 1202, if there is only a single carrier frequency, the network node selects a best sCell from the candidate sCells on the carrier frequency based on the statistics (step 1218). In one embodiment, the best sCell is the candidate sCell on the carrier frequency having the highest success rate. The network node then configures the selected sCell as an sCell of the wireless device 30 (step 1220). Thereafter, the network node determines whether the configured sCell is a successful sCell for the wireless device 30, as discussed above (step 1222). While not illustrated, the network node updates the statistics for the configured sCell based on the result of the determination in step 1210, as described above.

If the configured sCell is successful, the process ends. Otherwise, the network node determines whether there are more candidate sCells (step 1224). If not, the process ends. Otherwise, the network node selects a best candidate sCell from the candidate sCells on the carrier frequency excluding the previously configured and unsuccessful sCell(s) (step 1226). At that point, the process returns to step 1220 and is repeated until either a successful sCell is selected or all of the candidate sCells have been processed.

Figure 16A:
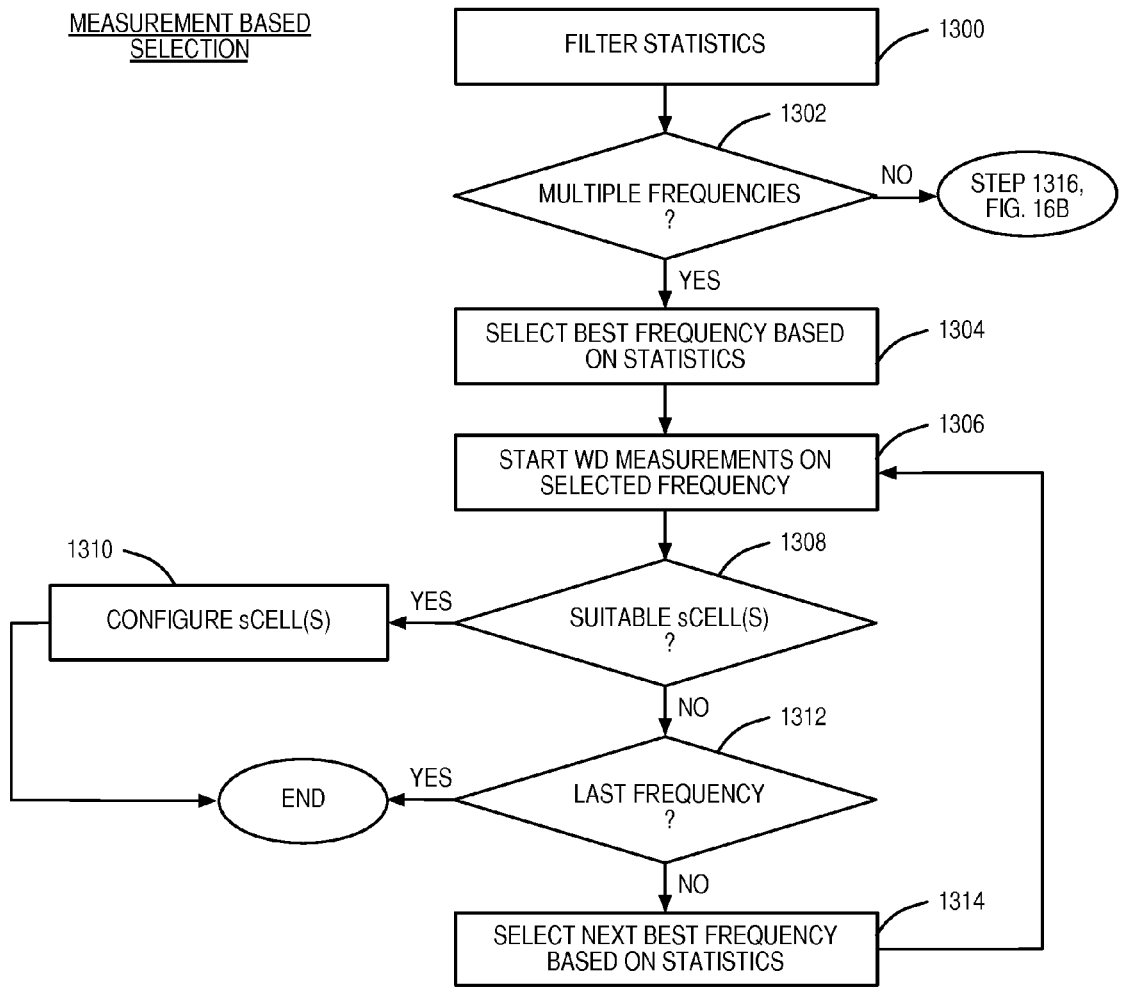
FIGS. 16A and 16B illustrate a measurement-based statistics-assisted sCell selection process according to one embodiment of the present disclosure.
Figure 16B:
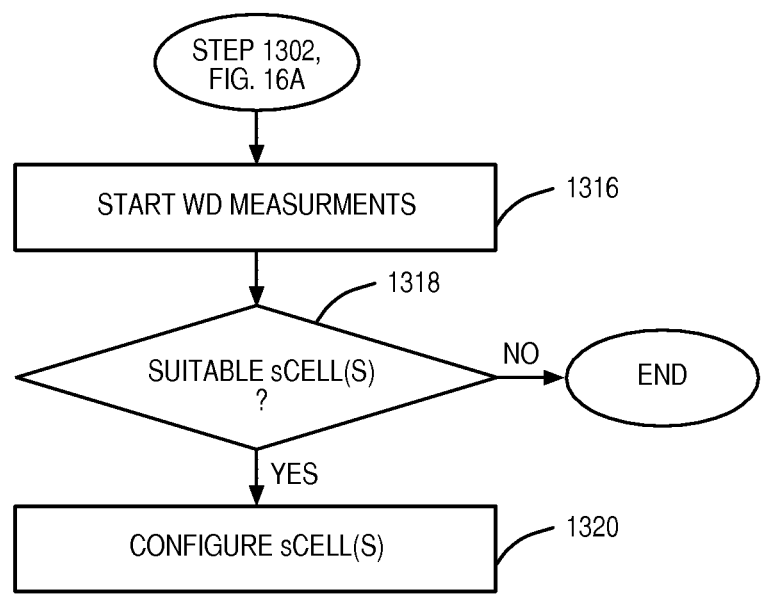

FIGS. 16A and 16B illustrate a statistics-assisted sCell selection process that utilizes measurement-based selection according to one embodiment of the present disclosure. This process is performed by a network node such as, but not limited to, the base station 32. Notably, not all of the illustrated steps are performed in all embodiments. When a wireless device 30 connects to a pCell and more than one candidate sCell exists, the network node performs an sCell selection process, which in this example is the process of FIGS. 16A and 16B. For this discussion, the pCell is the cell 28-1 and, as such, the cell 28-1 is referred to as pCell 28-1.

As illustrated, in some embodiments, the network node filters the statistics, as discussed above with respect to step 1200 of FIG. 15A (step 1300). In this embodiment, the network node determines whether there are candidate sCells for the wireless device 30 on multiple carrier frequencies (step 1302). If so, the network node selects a best carrier frequency for sCell selection for the wireless device 30 based on the (filtered) statistics, as discussed above (step 1304). Once the best carrier frequency is selected, the network node starts wireless device based measurements on the candidate sCell(s) for the selected carrier frequency (step 1306). For LTE, these wireless device based measurements are layer 3 (L3) measurements. Based on measurement report(s) received from the wireless device 30, the network node determines whether any suitable sCell(s) were detected and measured by the wireless device 30 (step 1308). If so, the network node configures one or more of the suitable sCells as an sCell(s) of the wireless device 30 (step 1310), and the process then ends. More specifically, in one embodiment, the network node selects the strongest cell as the sCell to configure. In another embodiment, if there are one or more cells that are stronger than a predefined threshold, then the network node selects up to a predefined number of the strongest cells above the threshold as the sCell(s) to configure for the wireless device 30. However, if no suitable sCell(s) were detected by the wireless device 30 on the selected carrier frequency, the network node determines whether there are more carrier frequencies to process (step 1312). If not, the process ends. Otherwise, the network node selects the next best carrier frequency (step 1314), and the process then returns to step 1306 and is repeated.

Returning to step 1302, if there is only one carrier frequency, the network node starts wireless device based measurements on the candidate sCell(s) for the carrier frequency (step 1316). Based on measurement report(s) received from the wireless device 30, the network node determines whether there any suitable sCell(s) were detected and measured by the wireless device 30 (step 1318). If so, the network node configures one or more of the suitable sCells as an sCell(s) of the wireless device 30 (step 1320). Otherwise, the process ends.

Figure 17:
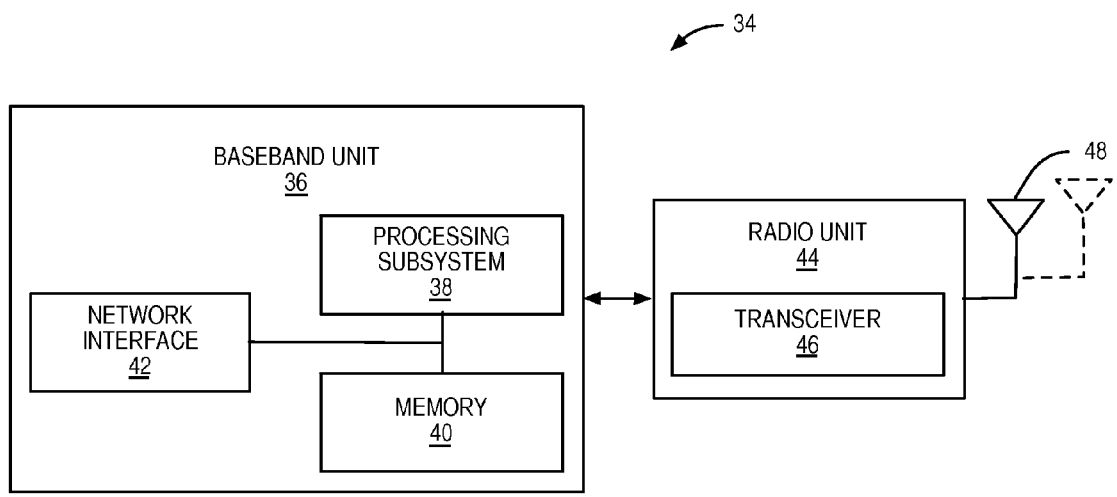
FIG. 17 is a block diagram of a network node according to one embodiment of the present disclosure.

FIG. 17 is a block diagram of a radio access node 34 (e.g., the base station 16 or the base station 32) according to one embodiment of the present disclosure. As illustrated, the radio access node 34 includes a baseband unit 36 including a processing subsystem 38, memory 40, and a network interface 42, and a radio unit 44 including a transceiver 46 connected to one or more antennas 48. The transceiver 46 generally includes analog and, in some embodiments, digital components for wirelessly sending and receiving data to and from the wireless devices 22 or 30 (not shown). From a wireless communications protocol view, the transceiver 46 implements at least part of Layer 1 (i.e., the Physical or "PHY" Layer).

The processing subsystem 38 generally implements any remaining portion of Layer 1 not implemented by the transceiver 46, as well as functions for higher layers in the wireless communications protocol (e.g., Layer 2 (data link layer), Layer 3 (network layer), etc.). In particular embodiments, the processing subsystem 38 may comprise, for example, one or several general-purpose or special-purpose microprocessors or other microcontrollers programmed with suitable software and/or firmware to carry out some or all of the functionality of the base station 16 or 32 described herein. In addition or alternatively, the processing subsystem 38 may comprise various digital hardware blocks (e.g., one or more Application Specific Integrated Circuits (ASICs), one or more off-the-shelf digital and analog hardware components, or a combination thereof) configured to carry out some or all of the functionality of the base station 16 or 32 described herein. Additionally, in particular embodiments, the above-described functionality of the radio access node 34 may be implemented, in whole or in part, by the processing subsystem 38 executing software or other instructions stored on a non-transitory computer-readable medium such as, for example, the memory 40 or any other suitable type of data storage component(s).

Figure 18:
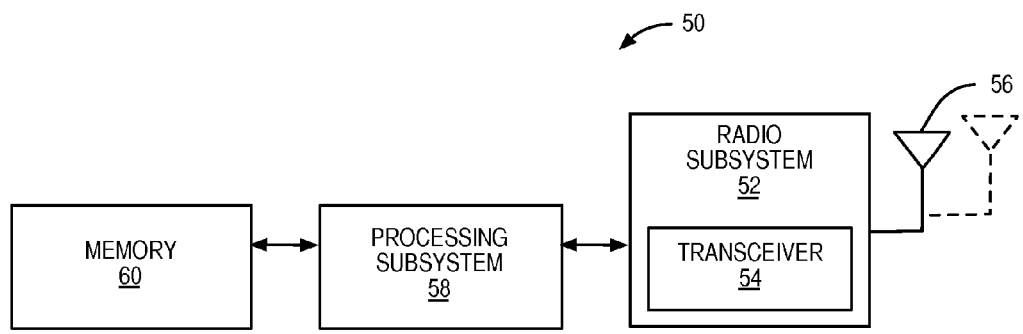
FIG. 18 is a block diagram of a wireless device according to one embodiment of the present disclosure.

FIG. 18 is a block diagram of a wireless device 50 (e.g., the wireless device 22 or 30) according to one embodiment of the present disclosure. As illustrated, the wireless device 50 includes a radio subsystem 52 including a transceiver 54 connected to one or more antennas 56, a processing subsystem 58, and memory 60. The transceiver 54 generally includes analog and, in some embodiments, digital components for wirelessly sending and receiving data to and from the base station 16 or 32 and the RRHs 18. From a wireless communications protocol view, the transceiver 54 implements at least part of Layer 1 (i.e., the Physical or "PHY" Layer).

The processing subsystem 58 generally implements any remaining portion of Layer 1 not implemented by the radio subsystem 52, as well as functions for higher layers in the wireless communications protocol (e.g., Layer 2 (data link layer), Layer 3 (network layer), etc.). In particular embodiments, the processing subsystem 58 may comprise, for example, one or several general-purpose or special-purpose microprocessors or other microcontrollers programmed with suitable software and/or firmware to carry out some or all of the functionality of the wireless device 22 or 30 described herein. In addition or alternatively, the processing subsystem 58 may comprise various digital hardware blocks (e.g., one or more ASICs, one or more off-the-shelf digital and analog hardware components, or a combination thereof) configured to carry out some or all of the functionality of the wireless device 22 or 30 described herein. Additionally, in particular embodiments, the above-described functionality of the wireless device 22 or 30 may be implemented, in whole or in part, by the processing subsystem 58 executing software or other instructions stored on a non-transitory computer-readable medium, such as the memory 60 or any other suitable type of data storage component(s).

Figure 19:
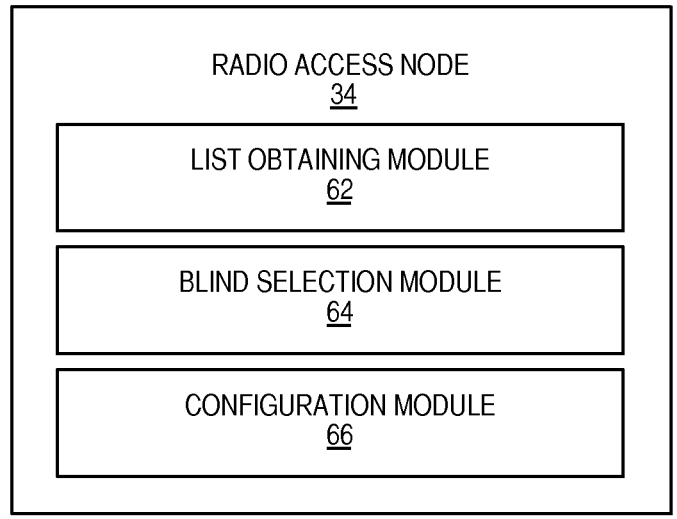
FIG. 19 is a block diagram of a radio access node for configuring a wireless device with an sCell according to one embodiment of the present disclosure.

FIG. 19 is a block diagram of the radio access node 34 for configuring the wireless device 22 (not shown) with an sCell 24 (not shown) according to one embodiment of the present disclosure. In this embodiment, the radio access node 34 operates according to any one of the embodiments of FIGS. 1 through 8. As illustrated, the radio access node 34 includes a list obtaining module 62, a blind selection module 64, and a configuration module 66 that are each implemented in software that, when executed by a processor of the radio access node 34, causes the radio access node 34 to operate according to any one of the embodiments described above with respect to FIGS. 1 through 8. The list obtaining module 62 operates to provide the functionality of the radio access node 34 with respect to steps 100, 200, 300, 400, 500, or 600 described above. Likewise, the blind selection module 64 operates to provide the functionality of the radio access node 34 with respect steps 104, 204, 304, 404, 418, 506, 518, or 610 described above. The configuration module 66 operates to provide the functionality of the radio access node 34 with respect to steps 106, 206, 210, 212, 306, 406, 414, 420, 508, 516, 520, 612, or 620 described above.

Figure 20:
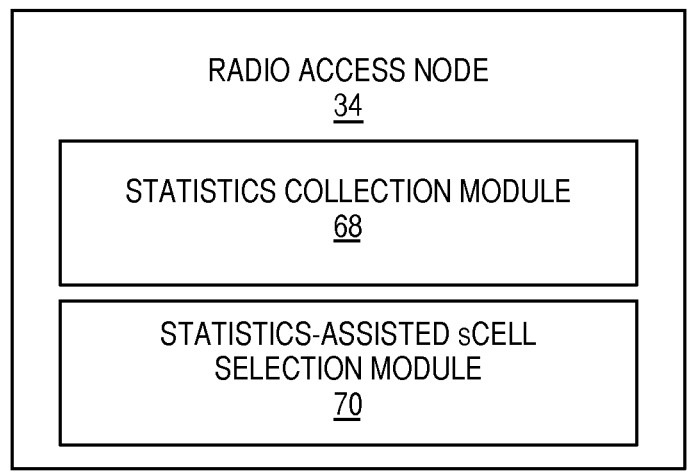
FIG. 20 is a block diagram of a radio access node for configuring a wireless device with an sCell according to another embodiment of the present disclosure.

FIG. 20 is a block diagram of the radio access node 34 for configuring the wireless device 30 (not shown) with an sCell (not shown) using a statistics-assisted sCell selection process according to one embodiment of the present disclosure. In this embodiment, the radio access node 34 operates according to any one of the embodiments of FIGS. 9 through 16A and 16B. As illustrated, the radio access node 34 includes a statistics collection module 68 and a statistics-based sCell selection module 70 that are each implemented in software that, when executed by a processor of the radio access node 34, causes the radio access node 34 to operate according to any one of the embodiments described above with respect to FIGS. 9 through 16A and 16B.

In one embodiment, a computer program including instructions which, when executed by at least one processor, causes the at least one processor to carry out the functionality of the radio access node 34 according to any one of the embodiments described herein. In one embodiment, a carrier containing the aforementioned computer program product is provided. The carrier is one of an electronic signal, an optical signal, a radio signal, or a computer-readable storage medium (e.g., a non-transitory computer-readable medium such as the memory 40 shown in FIG. 17).

While the embodiments described herein provide numerous advantages, in some example implementations, at least some of the embodiments provide the advantage of configuring a wireless device 22 with an sCell 24 that is blindly selected, eliminating the need for measurement gaps that can cause a lack of throughput. Note, however, that this advantage is just an example and is not intended to limit the scope of the embodiments disclosed herein. Further, in some embodiments, by using statistics to assist the sCell selection process, the sCell process becomes more efficient (e.g., by reducing the number of failed or unsuccessful blind sCell selections or measurements). Further, embodiments of the statistics-based sCell selection process allow blind sCell selection with a high possibility or probability of success. Still further, end-user performance and system capacity can be increased. In addition, in some embodiments, functionality for recommending suitable sCell candidates and/or removing unsuitable sCell candidates is provided.

The following acronyms are used throughout this disclosure.

3GPP $3^{rd}$ Generation Partnership Project
ASIC Application Specific Integrated Circuit
CC Component Carrier
eNB evolved Node B
L3 Inter-Frequency Layer 3
LTE Long Term Evolution
LTE Rel-8 Long Term Evolution Release 8
LTE Rel-10 Long Term Evolution Release 10
MHz Megahertz
PCC Primary Component Carrier
pCell Primary Cell
RRC Radio Resource Control
RRH Remote Radio Head
RRU Remote Radio Unit
RSRP Reference Signal Received Power RSRQ Reference Signal Received Quality
SCC Secondary Component Carrier
sCell Secondary Cell
UE User Equipment Those skilled in the art will recognize improvements and modifications to the preferred embodiments of the present disclosure. All such improvements and modifications are considered within the scope of the concepts disclosed herein and the claims that follow.

What is claimed is:

1. A method of operating a network node to provide secondary cell, sCell, selection in a carrier aggregation scheme, the method comprising:
collecting statistics indicative of correlation between one or more source cells and one or more successful and/or non-successful sCells for carrier aggregation for each of the one or more source cells; and
performing sCell selection, based on the statistics without obtaining a signal quality measurement of the selected sCell, for one or more wireless devices for carrier aggregation, wherein performing the sCell selection comprises:
selecting a carrier frequency from a plurality of carrier frequencies based on the statistics, the selected carrier frequency having a best possibility of successful sCell selection for a wireless device of the one or more wireless devices;
selecting a candidate sCell from a plurality of candidate sCells for the selected carrier frequency based on the statistics, the selected candidate sCell having a best possibility of being a successful sCell for the wireless device; and
configuring the candidate sCell as an sCell of the wireless device.

2. The method of claim 1 wherein collecting the statistics comprises:
receiving, from the wireless device, a measurement report comprising at least one measurement for the candidate sCell;
determining whether the candidate sCell satisfies one or more criteria for a successful sCell based on the measurement report; and
recording a success for the candidate sCell with respect to a source cell of the wireless device if the candidate sCell satisfies the one or more criteria for a successful sCell for carrier aggregation.

3. The method of claim 2 wherein collecting the statistics further comprises recording a non-success for the candidate sCell with respect to the source cell of the wireless device if the candidate sCell does not satisfy the one or more criteria for a successful sCell.

4. The method of claim 1 wherein collecting the statistics comprises:
determining whether a configured sCell of the wireless device is a successful sCell for the wireless device; and
recording a success for the configured sCell of the wireless device with respect to a source cell of the wireless device if the configured sCell of the wireless device is determined to be a successful sCell.

5. The method of claim 4 wherein the source cell of the wireless device is a primary cell, pCell, of the wireless device.

6. The method of claim 4 wherein collecting the statistics further comprises:
receiving a measurement report from the wireless device for the configured sCell of the wireless device;
wherein determining whether the configured sCell of the wireless device is a successful sCell comprises determining whether the configured sCell of the wireless device is a successful sCell based on the measurement report.

7. The method of claim 6 wherein collecting the statistics further comprises recording a non-success for the configured sCell of the wireless device with respect to the source cell of the wireless device if the configured sCell of the wireless device is determined not to be a successful sCell.

8. The method of claim 7 wherein:
determining whether the configured sCell of the wireless device is a successful sCell based on the measurement report comprises determining whether a quality of the candidate sCell is worse than a predefined threshold based on the measurement report; and
recording the non-success for the candidate sCell comprises recording the non-success for the candidate sCell with respect to the source cell of the wireless device if the quality of the candidate sCell is worse than the predefined threshold.

9. The method of claim 6 wherein:
determining whether the configured sCell of the wireless device is a successful sCell based on the measurement report comprises determining whether a quality of the candidate sCell is better than a predefined threshold based on the measurement report; and
recording the success for the candidate sCell comprises recording the success for the candidate sCell with respect to the source cell of the wireless device if the quality of the candidate sCell is better than the predefined threshold.

10. The method of claim 6 wherein the measurement report includes a measurement for a candidate sCell for the wireless device that is different than the configured sCell of the wireless device, and collecting the statistics further comprises:
determining whether a quality of the candidate sCell of the wireless device is better than a predefined threshold based on the measurement report; and
recording a success for the candidate sCell with respect to the source cell of the wireless device if the quality of the candidate sCell is better than the predefined threshold.

11. The method of claim 4 wherein the configured sCell is a configured and activated sCell, and determining whether the configured sCell of the wireless device is a successful sCell comprises:
determining that the configured sCell of the wireless device is a successful sCell if there is successful transmission to or from the wireless device on the configured and activated sCell.

12. The method of claim 1 wherein, in order to provide the sCell selection for the wireless device, performing the sCell selection based on the statistics further comprises:
determining whether the sCell configured for the wireless device is a successful sCell for the wireless device; and
if the sCell configured for the wireless device is not a successful sCell for the wireless device:
selecting, from the plurality of carrier frequencies, a new carrier frequency having a best probability of successful sCell selection when excluding the sCell determined to not be a successful sCell based on the statistics;
selecting, from a plurality of potential sCells for the new carrier frequency, a new candidate sCell having a best possibility of being a successful sCell for the wireless device when excluding the sCell determined to not be a successful sCell based on the statistics; and configuring the new candidate sCell as a new sCell of the wireless device.

13. The method of claim 1 wherein performing the sCell selection based on the statistics comprises, in order to provide the sCell selection for the wireless device:

selecting the carrier frequency for sCell selection for the wireless device from the plurality of carrier frequencies based on the statistics; and starting measurements by the wireless device on the carrier frequency selected for the sCell selection for the wireless device to thereby initiate a measurement-based sCell selection process for the wireless device on the carrier frequency selected for the wireless device.

14. The method of claim 13 wherein, in order to provide the sCell selection for the wireless device, performing the sCell selection based on the statistics further comprises:

determining whether a successful sCell is found for the wireless device on the carrier frequency for the sCell selection for the wireless device; and if the successful sCell is not found:

selecting, based on the statistics, one of the plurality of carrier frequencies having a next best possibility of having a successful sCell for the wireless device as a new carrier frequency for the sCell selection for the wireless device; and starting measurements by the wireless device on the new carrier frequency selected for the sCell selection for the wireless device to thereby initiate the measurement based sCell selection process for the wireless device on the new carrier frequency selected for the wireless device.

15. A network node for providing secondary cell, sCell, selection in a carrier aggregation scheme, the network node comprising:

a processor; and memory containing instructions executable by the processor, whereby the network node is operative to:

collect statistics indicative of correlation between one or more source cells and one or more successful and/or non-successful sCells for carrier aggregation for each of the one or more source cells; and perform sCell selection, based on the statistics without obtaining a signal quality measurement of the selected sCell, for one or more wireless devices for carrier aggregation, wherein, in order to perform the sCell selection based on the statistics, the network node is operative to:

select a carrier frequency from a plurality of carrier frequencies based on the statistics, the selected carrier frequency having a best possibility of successful sCell selection for a wireless device of the one or more wireless devices;

select a candidate sCell from a plurality of candidate sCells for the selected carrier frequency based on the statistics, the selected candidate sCell having a best possibility of being a successful sCell for the wireless device; and configure the candidate sCell as an sCell of the wireless device.

16. The network node of claim 15 wherein, in order to collect the statistics, the network node is operative to:

receive, from the wireless device, a measurement report comprising at least one measurement for a candidate sCell;

determine whether the candidate sCell satisfies one or more criteria for a successful sCell based on the measurement report; and record a success for the candidate sCell with respect to a source cell of the wireless device if the candidate sCell satisfies the one or more criteria for a successful sCell.

17. The network node of claim 15 wherein, in order to collect the statistics, the network node is operative to:

determine whether a configured sCell of the wireless device is a successful sCell for the wireless device; and record a success for the configured sCell of the wireless device with respect to a source cell of the wireless device if the configured sCell of the wireless device is determined to be a successful sCell for carrier aggregation.

18. The network node of claim 17 wherein, in order to collect the statistics, the wireless device is further operative to:

receive a measurement report from the wireless device for the configured sCell of the wireless device;

wherein, in order to determine whether the configured sCell of the wireless device is a successful sCell, the network node is further operative to determine whether the configured sCell of the wireless device is a successful sCell based on the measurement report.

19. The network node of claim 17 wherein, in order to determine whether the configured sCell of the wireless device is a successful sCell, the network node is operative to:

determine that the configured sCell of the wireless device is a successful sCell if there is successful transmission to or from the wireless device on the configured sCell.

20. The network node of claim 15 wherein, in order to perform the sCell selection based on the statistics, the network node is further operative to, in order to provide the sCell selection for the wireless device:

select the carrier frequency for the sCell selection for the wireless device from the plurality of carrier frequencies based on the statistics; and start measurements by the wireless device on the carrier frequency selected for the sCell selection for the wireless device to thereby initiate a measurement-based sCell selection process for the wireless device on the carrier frequency selected for the wireless device.

* * * * *